(12) United States Patent
Lin

(10) Patent No.: US 12,556,108 B2
(45) Date of Patent: Feb. 17, 2026

(54) POWER SUPPLY CIRCUIT, POWER SUPPLY METHOD AND ELECTRONIC DEVICE

(71) Applicant: Halo Microelectronics Co., Ltd, Foshan (CN)

(72) Inventor: Changwei Lin, Foshan (CN)

(73) Assignee: Halo Microelectronics Co., Ltd., Foshan (CN)

( * ) Notice: Subject to any disclaimer, the term of this patent is extended or adjusted under 35 U.S.C. 154(b) by 178 days.

(21) Appl. No.: 18/242,498

(22) Filed: Sep. 5, 2023

(65) Prior Publication Data

US 2024/0154540 A1    May 9, 2024

(30) Foreign Application Priority Data

Nov. 7, 2022 (CN) .......................... 202211387034.1

(51) Int. Cl.
*H02M 7/217* (2006.01)
*H02M 1/32* (2007.01)
*H02M 7/06* (2006.01)

(52) U.S. Cl.
CPC ........... *H02M 7/2176* (2013.01); *H02M 1/32* (2013.01); *H02M 7/062* (2013.01); *H02M 7/06* (2013.01)

(58) Field of Classification Search
CPC ............ H02M 7/02; H02M 7/04; H02M 7/06; H02M 7/062; H02M 1/32; H02M 7/2176
See application file for complete search history.

(56) References Cited

U.S. PATENT DOCUMENTS

| | | | | |
|---|---|---|---|---|
| 6,169,391 B1* | 1/2001 | Lei | ............................. | G05F 1/56 |
| | | | | 323/273 |
| 7,715,216 B2* | 5/2010 | Liu | ........................ | H02M 3/155 |
| | | | | 323/266 |
| 9,263,938 B2* | 2/2016 | Kelly | ..................... | H05B 47/10 |
| 2006/0083038 A1* | 4/2006 | Lynch | .................. | H02M 7/2176 |
| | | | | 363/127 |
| 2009/0309554 A1* | 12/2009 | Fischer | ............... | H02M 3/1563 |
| | | | | 320/166 |
| 2014/0307491 A1* | 10/2014 | Urienza | ............... | H02H 7/1252 |
| | | | | 363/52 |
| 2021/0126548 A1* | 4/2021 | Wang | .................... | H02M 7/217 |

FOREIGN PATENT DOCUMENTS

| | | |
|---|---|---|
| CN | 206186817 U | 5/2017 |
| CN | 108206517 A | 6/2018 |
| CN | 108667316 A | 10/2018 |
| CN | 108832703 A | 11/2018 |
| CN | 109028181 A | 12/2018 |
| CN | 112886835 A | 6/2021 |

* cited by examiner

*Primary Examiner* — Gary L Laxton
(74) *Attorney, Agent, or Firm* — AP3 Law Firm PLLC

(57) ABSTRACT

A power supply circuit includes a rectifier branch, a switch branch, a capacitor branch and a control branch. The rectifier branch is used for rectifying an AC power source to output a first power supply. The control branch is used to output a first driving signal for a first time when an absolute value of an AC voltage of the AC power source is less than a first voltage threshold, or when an absolute value of the first voltage across the switch branch is less than a second voltage threshold. In response to the first driving signal, the switch branch conducts and establishes a connection between the rectifier branch and the capacitor branch. When the control branch outputs the first driving signal for the first time, the switch branch conducts for the first time.

19 Claims, 19 Drawing Sheets

If the absolute value of the AC voltage is not less than a third voltage threshold, controlling the switch branch to disconnect. ⟋1701

After the switch branch is disconnected, if the absolute value of the AC voltage is less than the third voltage threshold, controlling the switch branch to conduct. ⟋1702

Figure 17

POWER SUPPLY CIRCUIT, POWER SUPPLY METHOD AND ELECTRONIC DEVICE

RELATED APPLICATION

This application claims the benefit of and priority to Chinese Patent Application No. 2022113870341, filed on Nov. 7, 2022, which is hereby incorporated by reference in its entirety.

TECHNICAL FIELD

The present application relates to the technical field of electronic circuits, and in particular, to a power supply circuit, a power supply method and an electronic device.

BACKGROUND

Filter capacitors are commonly used in AC power adaptors of electronic devices such as mobile phones or notebook computers, so as to obtain a DC voltage output from AC utility power and other power sources.

However, when the electronic device turns on, if it is close to the peak voltage value of the AC power supply, for example, the power supply is the utility power, and the phase of the utility power is close to 90° or 270° when the electronic device is turned on, the AC voltage is close to 380V, and the energy storage on the filter capacitor C1 is 0, which is equivalent to a short circuit. Then a large inrush current will be generated, thereby damaging the electronic components in the electronic device.

SUMMARY

The present application aims to provide a power supply circuit, a power supply method and an electronic device, which can reduce the risk of damaging electronic components.

In order to achieve the above purpose, in the first aspect, the present application provides a power supply circuit comprising a rectifier branch, a switch branch, a capacitor branch and a control branch.

The rectifier branch is connected to an AC power supply, and the rectifier branch is used to rectify the AC power supply to output a first power supply output.

The control branch is connected to the AC power supply and is configured to output a first driving signal for the first time when the absolute value of the AC voltage of the AC power supply is less than a first voltage threshold or when the absolute value of the first voltage across two terminals of the switch branch is less than a second voltage threshold.

The switch branch is connected to the control branch, and the switch branch is connected between the rectifier branch and the capacitor branch. The switch branch is configured to conduct in response to the first driving signal, establishing a connection between the rectifier branch and the capacitor branch. When the control branch outputs the first driving signal for the first time, the switch branch is turned on for the first time.

The capacitor branch is connected to an electrical load, and the capacitor branch is charged by the first power supply when connected to the rectifier branch, thereby producing a voltage for powering the electrical load. In an optional embodiment, the control branch is further configured to output a second driving signal when the absolute value of the AC voltage is not less than a third voltage threshold after the first conduction of the switch branch.

The switch branch is further configured to, in response to the second driving signal, sever the connection between the rectifier branch and the capacitor branch.

In another optional embodiment, the control branch is further configured to output the first driving signal when the absolute value of the AC voltage is less than a third voltage threshold after the first conduction and disconnection of the switch branch.

In yet another optional embodiment, the rectifier branch includes a first diode, a second diode, a third diode and a fourth diode. The anode of the first diode is connected to the cathode of the third diode and the first terminal of the AC power supply. The anode of the second diode is connected to the cathode of the fourth diode and the second terminal of the AC power supply. The cathode of the first diode and the cathode of the second diode are connected to a first connection point. The anode of the third diode and the anode of the fourth diode are connected to a second connection point. When the first connection point is connected to the switch branch, the second connection point is connected to the capacitor branch. When the first connection point is connected to the capacitor branch, the second connection point is connected to the switch branch.

In one optional embodiment, the control branch includes a sampling branch, a first voltage dividing branch and a first controller.

The first terminal of the sampling branch is connected to the first terminal of the AC power supply and the first terminal of the rectifier branch. The second terminal of the sampling branch is connected to the second terminal of the AC power supply and the second terminal of the rectifier branch. The third terminal of the sampling branch is connected to the first terminal of the first voltage dividing branch. The second terminal of the first voltage dividing branch is connected to the first input terminal of the first controller. The third terminal of the first voltage dividing branch is connected to the third terminal of the rectifier branch and the ground terminal of the first controller. The fourth terminal of the rectifier branch is connected to the first terminal of the capacitor branch. The first output terminal of the first controller is connected to the first terminal of the switch branch.

The second terminal of the switch branch is connected to the third terminal of the rectifier branch. The third terminal of the switch branch and the second terminal of the capacitor branch are both grounded. Or, both the second terminal of the switch branch and the third terminal of the rectifier branch are grounded. The third terminal of the switch branch is connected to the second terminal of the capacitor branch.

The sampling branch is used for sampling the AC power supply and outputting a second power supply.

The first voltage dividing branch is used to divide the voltage of the second power supply to output a first detection voltage.

The first controller is configured to output the first driving signal for the first time when the first detection voltage is less than a fourth voltage threshold. When the absolute value of the AC voltage is less than the first voltage threshold, the first detection voltage is less than the fourth voltage threshold.

In another optional embodiment, the sampling branch includes a fifth diode and a sixth diode. The anode of the fifth diode is connected to the first terminal of the AC power source. The cathode of the fifth diode is connected to the cathode of the sixth diode and the first terminal of the first voltage dividing branch. The cathode of the sixth diode is connected to the second terminal of the AC power source.

In another optional embodiment, the first voltage dividing branch includes a first resistor and a second resistor.

The first terminal of the first resistor is connected to the third terminal of the sampling branch. The second terminal of the first resistor is connected to the first input terminal of the first controller and the first terminal of the second resistor. The second terminal of the second resistor is connected to the third terminal of the rectifier branch.

In another optional embodiment, the control branch is further configured to output a third driving signal when a second voltage across the capacitor branch is not less than a fifth voltage threshold after the switch branch is turned on for the first time.

The switch branch is further configured to, in response to the third driving signal, disconnect the connection between the rectifier branch and the capacitor branch.

In another optional embodiment, the control branch is further configured to output the first driving signal when the sum of the first voltage and the second voltage is not greater than the fifth voltage threshold after the switch branch has been turned on and off for the first time.

In another optional embodiment, the control branch includes a second voltage dividing branch, a third voltage dividing branch, a voltage conversion branch, and a second controller.

The second voltage dividing branch is used to divide the first voltage and output a second detection voltage. The third voltage dividing branch is used to divide the second voltage and output a third detection voltage.

The second controller is configured to output the first driving signal for the first time when the absolute value of the second detection voltage is less than a sixth voltage threshold. When the absolute value of the second voltage is less than the second voltage threshold, the absolute value of the second detection voltage is less than the sixth voltage threshold.

The voltage conversion branch is configured to convert the voltage of the fourth terminal of the rectifier branch to provide a supply voltage for the second controller.

In another optional embodiment, the second voltage dividing branch includes a third resistor and a fourth resistor, and the third voltage dividing branch includes a fifth resistor and a sixth resistor.

The first terminal of the third resistor is connected to the third terminal of the switch branch. The second terminal of the third resistor is connected to the first terminal of the fourth resistor and the first input terminal of the second controller. The second terminal of the fourth resistor is connected to the second terminal of the switch branch.

The first terminal of the fifth resistor is connected to the first terminal of the capacitor branch. The second terminal of the fifth resistor is connected to the second input terminal of the second controller and the first terminal of the sixth resistor. The second terminal of the sixth resistor is grounded.

In another optional embodiment, the voltage conversion branch includes a seventh resistor and a first capacitor.

The first terminal of the seventh resistor is connected to the third terminal of the switch branch. The second terminal of the seventh resistor is connected to the first terminal of the first capacitor and the power supply terminal of the second controller. The second terminal of the first capacitor is connected to the second terminal of the switch branch.

In another optional embodiment, the voltage conversion branch includes a second capacitor, a third capacitor, an eighth resistor, a first Zener diode, a seventh diode, a transformer, a second switch and a third controller.

The first terminal of the second capacitor is connected to the cathode of the first Zener diode, the first terminal of the eighth resistor and the power supply terminal of the second controller. The second terminal of the second capacitor is connected to the second terminal of the third capacitor, the anode of the first Zener diode and the first terminal of the transformer. The ground terminal of the second controller is connected to the second terminal of the switch branch. The first terminal of the third capacitor is connected to the cathode of the seventh diode and the second terminal of the eighth resistor. The anode of the seventh diode is connected to the second terminal of the transformer and the third terminal of the second switch. The second terminal of the second switch is grounded. The first terminal of the second switch is connected to the first output terminal of the third controller.

In another optional embodiment, the switch branch includes a first switch.

The first terminal of the first switch is the first terminal of the switch branch. The second terminal of the first switch is the second terminal of the switch branch. The third terminal of the first switch is the third terminal of the switch branch.

In another optional embodiment, the capacitor branch includes a fourth capacitor.

The first terminal of the fourth capacitor is the first terminal of the capacitor branch, and the second terminal of the fourth capacitor is the second terminal of the capacitor branch.

In a second aspect, the present application provides a power supply method, which is applied to a power supply circuit. The power supply circuit includes a rectifier branch, a switch branch and a capacitor branch. The rectifier branch is connected to an AC power source. The switch branch is connected between the rectifier branch and the capacitor branch, and the capacitor branch is connected to an electrical load.

The method comprises obtaining the absolute value of the AC voltage from the AC power source, or the first voltage across the switch branch, if the absolute value of the AC voltage is less than the first voltage threshold, or the absolute value of the first voltage is less than the second voltage threshold, then generating a voltage to power the electrical load based on the AC voltage.

In an optional manner, the generating a voltage to power the electrical load based on the AC voltage includes controlling the conduction of the switch branch to establish a connection between the rectifier branch and the capacitor branch, rectifying the AC power supply through the rectifier branch, and outputting a first power supply, wherein, the first power supply is used for charging the capacitor branch to generate a voltage to power the electrical load.

In an optional manner, if the absolute value of the AC voltage is less than the first voltage threshold, then, after generating the voltage to power the electrical load based on the AC voltage, the method further includes if the absolute value of the AC voltage is not less than a third voltage threshold, controlling the switch branch to disconnect, after the switch branch is disconnected, if the absolute value of the AC voltage is less than the third voltage threshold, controlling the switch branch to conduct.

In another optional embodiment, if the absolute value of the first voltage is less than the second voltage threshold, then, after generating the voltage to power the electrical load based on the AC voltage, the method further includes if the second voltage across the capacitor branch is not less than a fifth voltage threshold, controlling the switch branch to disconnect, after the switch branch is disconnected, if the sum of the first voltage and the second voltage is not greater than the fifth voltage threshold, controlling the switch branch to conduct.

In a third aspect, the present application provides an electronic device including the above-mentioned power supply circuit.

The beneficial effects of this application are: the power supply circuit provided by the present application includes a rectifier branch, a switch branch, a capacitor branch and a control branch. The rectifier branch is used to rectify the AC power source to output the first power supply. The control branch is connected to the AC power source, and the control branch is used to output a first driving signal for the first time when the absolute value of the AC voltage of the AC power source is less than a first voltage threshold. Alternatively, the control branch is configured to output the first driving signal for the first time when the absolute value of the first voltage across the switch branch is less than a second voltage threshold. The switch branch is connected to the control branch, and the switch branch is connected between the rectifier branch and the capacitor branch. The switch branch is turned on in response to the first driving signal to establish the connection between the rectifier branch and the capacitor branch, wherein when the control branch outputs the first driving signal for the first time, the switch branch is turned on for the first time. The capacitor branch is connected to the electrical load, and the capacitor branch is used to be charged by the first power supply when connected to the rectifier branch, so as to output a voltage for supplying power to the electrical load. By the above-mentioned means, the risk of damaging electronic components due to being near the peak voltage of the AC power source during startup can be avoided, thereby reducing the risk of damaging electronic components.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 17 is a flowchart of an implementation provided by an embodiment of the present application after step 1502 shown in FIG. 15 is performed;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In order to make the purposes, technical solutions and advantages of the embodiments of the present application clearer, the technical solutions in the embodiments of the present application will be described clearly and completely below with reference to the drawings in the embodiments of the present application. Obviously, the described embodiments are some, but not all, embodiments of the present application. Based on the embodiments in this application, all other embodiments obtained by those of ordinary skill in the art without creative efforts shall fall within the protection scope of this application.

Figure 1:
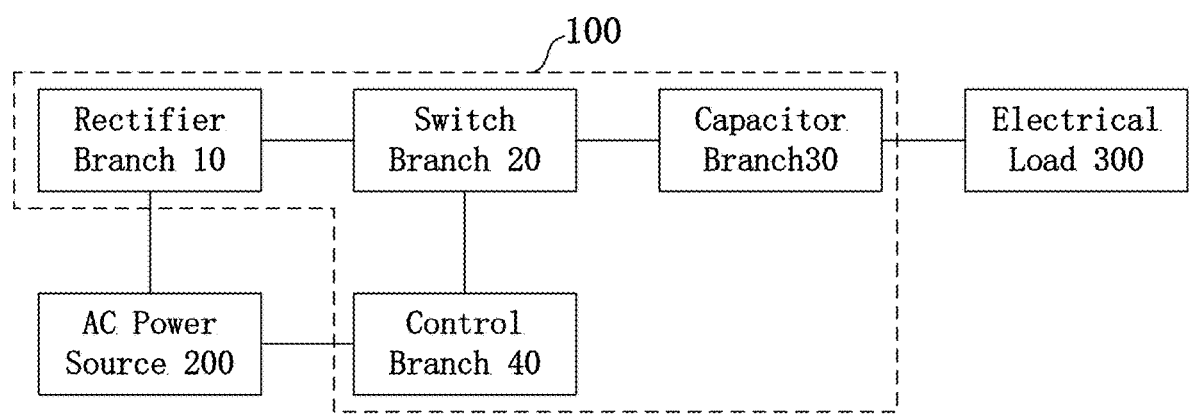
FIG. 1 is a schematic diagram of a power supply circuit provided by an embodiment of the present application.

Please refer to FIG. 1, which is a schematic diagram of a power supply circuit provided by an embodiment of the present application. As shown in FIG. 1, the power supply circuit 100 includes a rectifier branch 10, a switch branch 20, a capacitor branch 30 and a control branch 40. The rectifier branch 10 is connected to an AC power source 200. The control branch 40 is also connected to the AC power source 200. The switch branch 20 is connected to the control branch 40. The switch branch 20 is connected between the rectifier branch 10 and the capacitor branch 30. The capacitor branch 30 is connected to the electrical load 300.

Specifically, the rectifier branch 10 is used to rectify the AC power source 200 to generate a first power supply. The control branch 40 is configured to output a first driving signal for the first time when the absolute value of the AC voltage of the AC power source 200 is less than a first voltage threshold. Alternatively, the control branch 40 is configured to output the first driving signal for the first time when the absolute value of a first voltage across the switch branch 20 is less than a second voltage threshold. In response to the first driving signal, the switch branch 20 establishes a connection between the rectifier branch 10 and the capacitor branch 30. When the control branch 40 outputs the first driving signal for the first time, the switch branch 20 conducts for the first time. The capacitor branch 30 is charged by the first power supply when connected to the rectifier branch 10, and the capacitor branch 30 outputs a voltage providing power to the electrical load 300.

In practical applications, when the electronic device to which the power supply circuit 100 provided by the embodiments of the present application is applied is powered on, in some embodiments, the control branch 40 can directly acquire the AC voltage from the AC power source 200, and determine the timing of the first conduction of the switch branch 20 to avoid generating an inrush current. Specifically, when the absolute value of the AC voltage of the AC power source 200 is less than the first voltage threshold, the control branch 40 can determine that the AC voltage of the AC power source 200 is used to charge the capacitor branch 30 without causing damage to the electronic components in the electronic device. In this case, the control branch 40 outputs the first driving signal for the first time to drive the switch branch 20 to conduct. Therefore, the capacitor branch 30 is charged by the first power supply output from the rectifier branch 10. The capacitor branch 30 outputs a voltage for supplying power to the electrical load 300.

For example, in one embodiment, the absolute value of the AC voltage of the AC power source 200 is less than the first voltage threshold, corresponding to the AC power source's voltage at the zero-crossing point. This value is the optimal timing for the first conduction of the switch branch 20 to avoid generating an inrush current.

In another embodiment, the control branch 40 determines the timing of the first conduction of the switch branch 20 without generating inrush current by obtaining the first voltage across the switch branch 20. Specifically, when the electronic device is turned on, that is, when the power supply circuit 100 is started, if the voltage on the capacitor branch 30 is zero, the voltage across the switch branch 20 is the AC voltage of the AC power source 200. If the voltage on the capacitor branch 30 is not zero, the first voltage across the switch branch 20 is the difference between the absolute value of the AC voltage of the AC power source 200 and the voltage across the capacitor branch 30. Then, when the absolute value of the first voltage is less than the second voltage threshold, the control branch 40 determines that the AC voltage of the AC power source 200 is within a range in which charging the capacitor branch 30 will not generate a current that damages the electronic components in the electronic device. In this case, the control branch 40 outputs the first driving signal to drive the switch branch 20 into conduction (turned on). Therefore, the capacitor branch 30 is charged by the first power supply output from the rectifier branch 10. The capacitor branch 30 outputs a voltage providing power to the electrical load 300.

For example, in one embodiment, when the electronic device is powered on, the voltage across the capacitor branch 30 is zero. When the absolute value of the AC voltage is less than the first voltage threshold, it corresponds to the AC power source being near the zero-crossing point, which is the optimal timing for the first conduction of the switch branch 20 to avoid generating inrush current. The control branch 40 can control the circuit to conduct (turn on) the switch branch 20 for the first time at this time.

For another example, in another embodiment, when the electronic device is powered on, the voltage across the capacitor branch 30 is not zero. Then, when the absolute value of the first voltage is less than the second voltage threshold, the difference between the absolute value of the AC voltage of the AC power source 200 and the voltage across the capacitor branch 30 is close to zero. This time is the optimum timing for the first conduction of the switch branch 20 to avoid generating inrush current. The control branch 40 can control the circuit to configure the switch branch 20 to conduct for the first time at this time.

It can be seen that even if the electronic device is started near the peak voltage of the AC power supply, since the control branch 40 does not control the switch branch 20 to conduct at this time, thus the capacitor branch 30 cannot be charged, which can prevent a large inrush current from occurring. Further, only when the absolute value of the AC voltage of the AC power supply is less than the first voltage threshold, or when the absolute value of the first voltage is less than the second voltage threshold, the control branch 40 controls the switch branch 20 to conduct to charge the capacitor branch 30 and supply power to the electrical load 300. The current generated at this time is within the tolerable range of the electronic components, reducing the risk of damaging the electronic components and prolonging the service life of the electronic device.

In this embodiment, the first voltage threshold and the second voltage threshold may be set according to actual application conditions, which are not specifically limited in this embodiment of the present application.

After the switch branch 20 is first conducted (turned on for the first time), the power supply circuit 100 enters steady state operation. At this point, it is also possible to control the voltage output to the electrical load 300 by detecting the AC voltage of the AC power supply and determining whether to conduct the switch branch 20. This control helps in reducing the required voltage rating requirements of the devices in the electrical load 300.

For example, in one embodiment, the control branch 40 is further configured to output the second driving signal when the absolute value of the AC voltage is not less than a third voltage threshold after the first conduction of the switch branch 20. In response to the second driving signal, the switch branch 20 is then disconnected. This severs the connection between the rectifier branch 10 and the capacitor branch 30. The specific value of the third voltage threshold can be set according to the actual application, which is not specifically limited in this embodiment of the present application.

In another embodiment, the control branch 40 is further used for the following: after the first conduction and first disconnection of the switch branch 20, when the absolute value of the AC voltage is less than the third voltage threshold, the control branch 40 outputs the first driving signal to drive the switch branch 20 to be turned on.

Specifically, when the absolute value of the AC voltage is not less than the third voltage threshold, the switch branch 20 is controlled to be disconnected (turned off), thereby limiting the voltage applied to the capacitor branch 30. Thereafter, when the absolute value of the AC voltage is less than the third voltage threshold, the switch branch 20 is controlled to conduct again. All in all, the switch branch 20 conducts only when the absolute value of the AC voltage is less than the third voltage threshold, thereby reducing the voltage rating requirement of the electrical load 300. This leads to lower cost, higher efficiency, smaller size and higher power density.

It should be understood that, if the absolute value of the AC voltage remains below the third voltage threshold after the first conduction of the switch branch 20, the switch branch 20 can be controlled to remain conducting continuously. The specific values of the third voltage threshold may be set according to the actual application, and this embodiment of the present application does not impose specific limitations on it.

Figure 2:
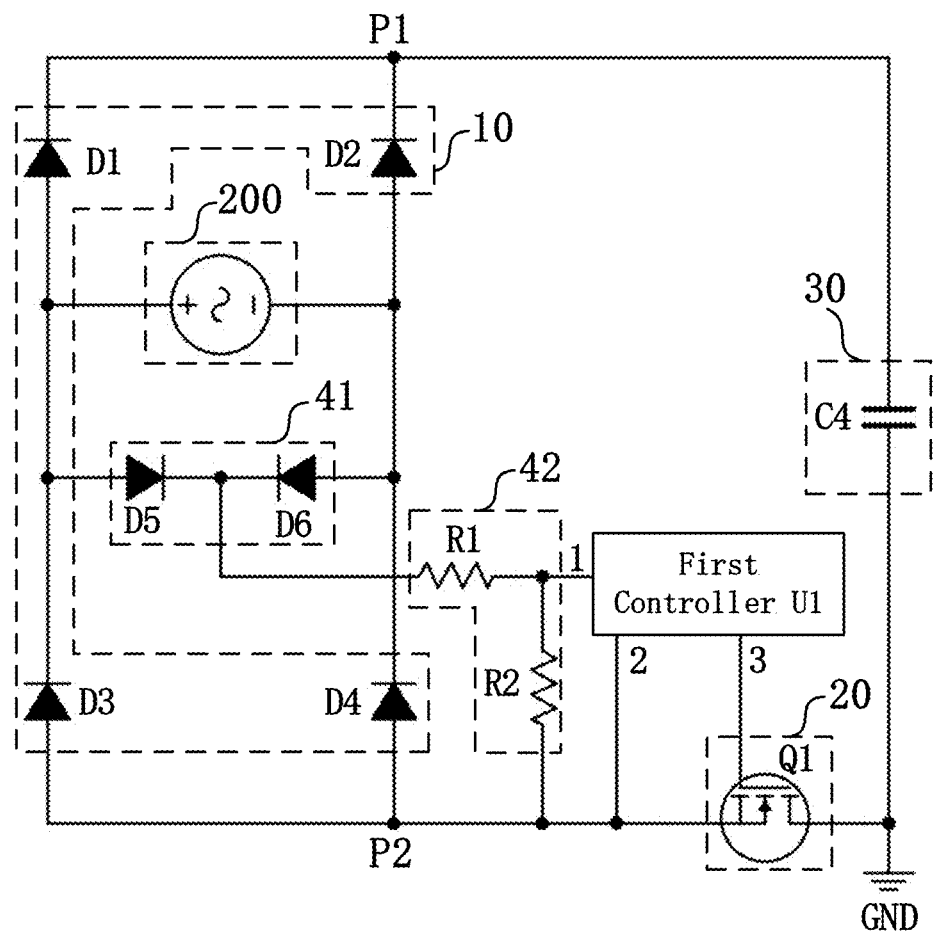
FIG. 2 is a schematic diagram of a power supply circuit provided by an embodiment of the present application.

In one embodiment, as shown in FIG. 2, the rectifier branch 10 comprises a first diode D1, a second diode D2, a third diode D3 and a fourth diode D4. The anode of the first diode D1 is connected to the cathode of the third diode D3 and the first terminal of the AC power source 200. The anode of the second diode D2 is connected to the cathode of the fourth diode D4 and the second terminal of the AC power source 200. The cathode of the first diode D1 and the cathode of the second diode D2 are connected to a first connection point P1. The anode of the third diode D3 and the anode of the fourth diode D4 are connected to a second connection point P2. Meanwhile, the first connection point P1 is connected to the capacitor branch 30. The second connection point P2 is connected to the switch branch 20.

In one embodiment, as shown in FIG. 2, the control branch 40 comprises a sampling branch 41, a first voltage dividing branch 42, and a first controller U1. The first terminal of the sampling branch 41 is connected to the first terminal of the AC power source 200 (using the non-inverting output terminal of the AC power source 200 as an example in this embodiment) and the first terminal of the rectifier branch 10. The second terminal of the sampling branch 41 is connected to the second terminal of the AC power source 200 (using the inverting output terminal of the AC power source 200 as an example in this embodiment) and the second terminal of the rectifier branch 10. The third terminal of the sampling branch 41 is connected to the first terminal of the first voltage dividing branch 42. The second terminal of the first voltage dividing branch 42 is connected to the first input terminal of the first controller U1 (i.e., the first pin of the first controller U1). The third terminal of the first voltage dividing branch 42 is connected to the third terminal of the rectifier branch 10 and the ground terminal of the first controller U1 (i.e., the second pin of the first controller U1). The fourth terminal of the rectifier branch 10 is connected to the first terminal of the capacitor branch 30. The first output terminal of the first controller U1 (i.e., the third pin of the first controller U1) is connected to the first terminal of the capacitor branch 20. The second terminal of the capacitor branch 20 is connected to the third terminal of the rectifier branch 10. The third terminal of the capacitor branch 20 and the second terminal of the capacitor branch 30 are both grounded (GND).

Specifically, the sampling branch 41 is used to sample the AC power source 200 and output a second power supply. The first voltage dividing branch 42 is used to divide the voltage of the second power supply to output a first detection voltage. The first controller U1 is configured to output the first driving signal for the first time when the first detection voltage is less than a fourth voltage threshold. When the absolute value of the AC voltage is less than the first voltage threshold, the first detection voltage is less than the fourth voltage threshold. The fourth voltage threshold can be set according to the actual application requirements, and this embodiment of the present application does not impose specific limitations on it.

In this embodiment, the first detection voltage obtained by sampling and dividing the AC voltage of AC power supply 200 is fed into the first controller U1. The first controller U1 can determine whether the AC power source 200 is in a position where the inrush current will not be generated according to the received first detection voltage. If so, the first controller U1 can output a first driving signal to drive the switch branch 20 to conduct for the first time, thereby reducing the risk of damaging the electronic components due to the inrush current.

FIG. 2 also exemplifies a structure of the sampling branch 41. As shown in FIG. 2, the sampling branch 41 comprises a fifth diode D5 and a sixth diode D6. The anode of the fifth diode D5 is connected to the first terminal of the AC power source 200. The cathode of the fifth diode D5 is connected to the cathode of the sixth diode D6 and the first terminal of the first voltage dividing branch 42. The anode of the sixth diode D6 is connected to the second terminal of the AC power source 200.

The fifth diode D5 and the sixth diode D6 are used to rectify the AC voltage input by the AC power source 200 (similar to taking an absolute value) and output it to the first terminal of the first voltage dividing branch 42 in the form of fluctuating waves.

FIG. 2 also exemplifies a structure of the first voltage dividing branch 42. As shown in FIG. 2, the first voltage dividing branch 42 comprises a first resistor R1 and a second resistor R2. The first terminal of the first resistor R1 is connected to the third terminal of the sampling branch 41. The second terminal of the first resistor R1 is connected to the first input terminal of the first controller U1 and the first terminal of the second resistor R2. The second terminal of the second resistor R2 is connected to the third terminal of the rectifier branch 10, That is, the second terminal of the second resistor R2 is connected to the second connection point P2.

FIG. 2 also exemplarily shows a structure of the switch branch 20. As shown in FIG. 2, the switch branch 20 includes a first switch transistor Q1. The first terminal of the first switch transistor Q1 is the first terminal of the switch branch 20. The second terminal of the first switch transistor Q1 is the second terminal of the switch branch 20. The third terminal of the first switch transistor Q1 is the third terminal of the switch branch 20. Specifically, the first terminal of the first switch transistor Q1 is connected to the first output terminal of the first controller U1. The second terminal of the first switch transistor Q1 is connected to the second connection point P2. The third terminal of the first switch transistor Q1 is grounded to GND.

In this embodiment, the first switch transistor Q1 is exemplified as an NMOS transistor. The gate of the NMOS transistor is the first terminal of the first switch transistor Q1. The source of the NMOS transistor is the second terminal of the first switch transistor Q1. The drain of the NMOS transistor is the third terminal of the first switch transistor Q1.

In addition, the first switch transistor Q1 can be any controllable switches. For example, it can be an insulated gate bipolar transistor (IGBT) device, an integrated gate commutated thyristor (IGCT) device, a gate turn-off thyristor (GTO) device, a Silicon Controlled Rectifier (SCR) device, a Junction Gate Field Effect Transistor (JFET) device, a MOS Controlled Thyristor (MCT) device, etc. In addition, the first switch transistor Q1 shown in FIG. 2 can be implemented as multiple switches connected in parallel.

FIG. 2 also exemplarily shows a structure of the capacitor branch 30. As shown in FIG. 2, the capacitor branch 20 includes a fourth capacitor C4. The first terminal of the fourth capacitor C4 is the first terminal of the capacitor branch 30, and the second terminal of the fourth capacitor C4 is the second terminal of the capacitor branch 30. Specifically, the first terminal of the fourth capacitor C4 is connected to the first connection point P1, and the second terminal of the fourth capacitor C4 is grounded to GND.

Figure 3:
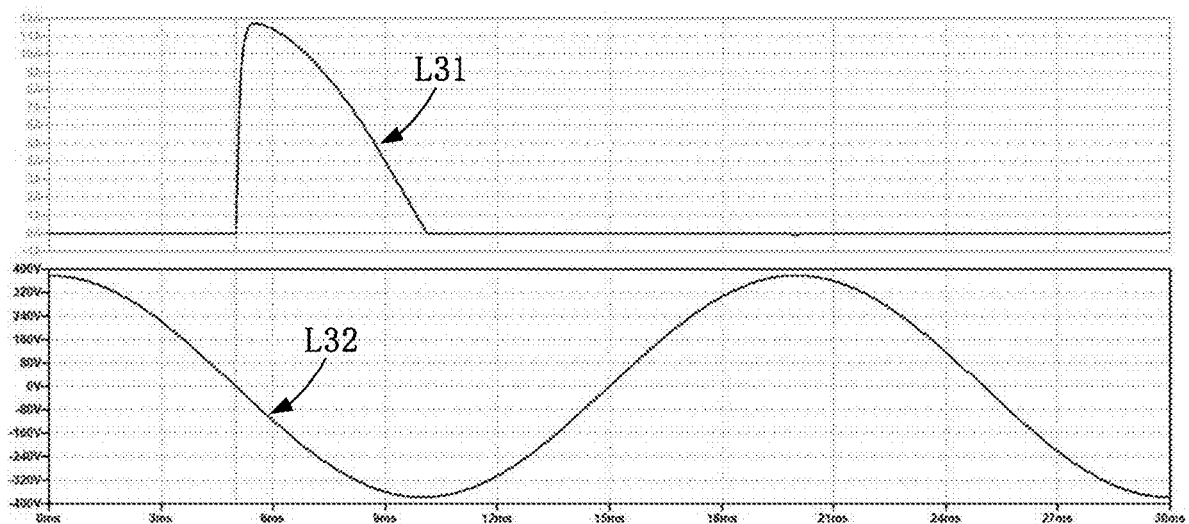
FIG. 3 is a schematic diagram of an AC voltage and a current flowing through a rectifier branch provided by an embodiment of the present application.

Please refer to FIG. 2 and FIG. 3 together. FIG. 3 is a waveform plot of the AC voltage of the AC power source 200 and the current flowing through the rectifier branch 10 according to an embodiment of the present application. The curve L31 is the current flowing through the rectifier branch 10. The curve L32 is the AC voltage of the AC power source 200. In this embodiment, the AC power source is exemplified as 220V utility power.

As shown in FIG. 3, during startup (i.e., at 0ms), the phase of the AC voltage of the AC power source 200 is 90°, and the RMS value of the AC voltage at this time is at its extreme condition of 264 VAC (i.e., the maximum value of the effective voltage). Under this extreme condition, the first controller U1 keeps the first switch transistor Q1 remaining off. Until the first controller U1 detects that the absolute value of the AC voltage of the AC power source 200 is less than the first preset threshold, the first switch transistor Q1 is turned on. Specifically, the first switch transistor Q1 is turned on when the absolute value of the AC voltage is near the zero-crossing point. At this time, the current flowing through the rectifier branch 10 is less than 12A, which is relatively small, resulting in a lower risk of damaging electronic components (e.g., the first rectifier diode D1) due to the inrush current.

From this embodiment, it can be seen that by detecting the AC voltage from the AC power source 200 and delaying the timing of turning on of the first switch transistor Q1 (i.e., the time point when the fourth capacitor C4 is connected) at a point near the zero-crossing point of the AC voltage, the maximum current flowing through each electronic component during startup remains relatively small, which is an advantageous feature for protecting the electronic components.

Figure 4:
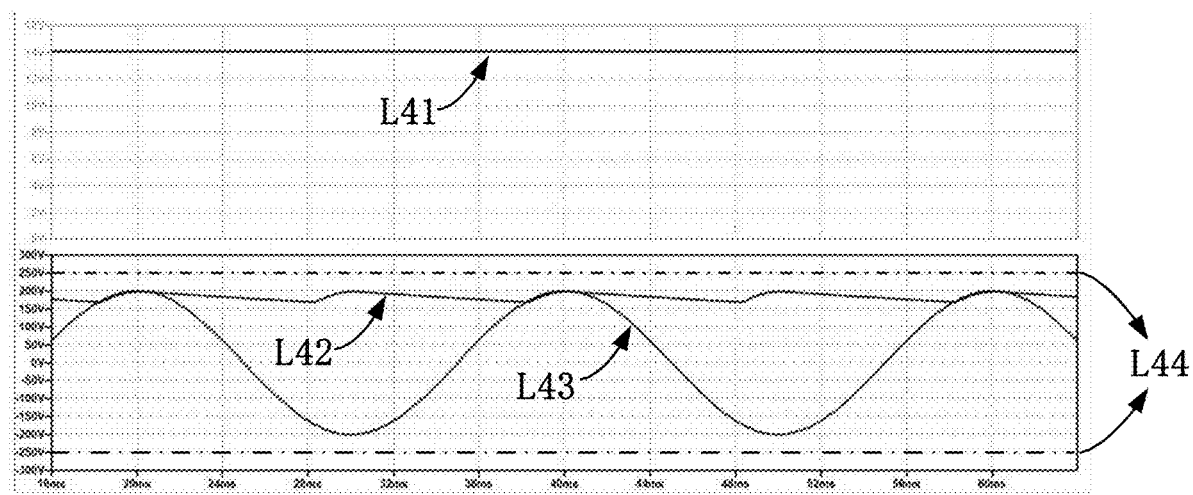
FIG. 4 is a schematic diagram of each voltage in a power supply circuit provided by an embodiment of the present application.

Please refer to FIG. 2 and FIG. 4 together. FIG. 4 is a waveform plot of various voltages in the power supply circuit 100 according to an embodiment of the present application. These voltages include the driving signal of the first switch, the third voltage threshold, the AC voltage of the AC power source 200 and the voltage waveform at the first connection point P1. Specifically, curve L41 represents the driving signal of the first switch transistor Q1. Curve L42 represents the voltage at the first connection point P1. Curve L43 represents the AC voltage from the AC power source 200, and curve L44 represents the positive third voltage threshold and the negative third voltage threshold. In this embodiment, the AC power source is implemented as 110V utility power as an example.

In this embodiment, after the first switch transistor Q1 is turned on for the first time, the absolute value of the AC voltage remains less than the third voltage threshold. Specifically, the maximum positive value of the AC voltage is less than the positive third voltage threshold, and the minimum negative value of the AC voltage is greater than the negative third voltage threshold value. Therefore, it is sufficient to control the first switch transistor Q1 to keep it continuously remaining turned on.

Figure 5:
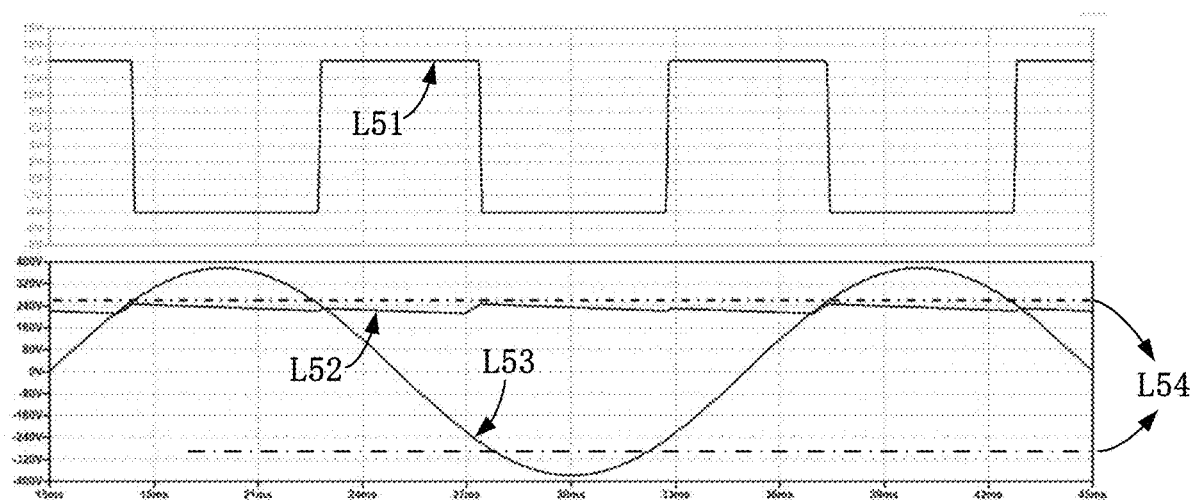
FIG. 5 is a schematic diagram of each voltage in a power supply circuit provided by another embodiment of the present application.

Please refer to FIG. 2 and FIG. 5 together. FIG. 5 is a waveform plot of various voltages in the power supply circuit 100 provided in this embodiment of the application. These voltages include the driving signal of the first switch transistor Q1, the third voltage threshold, the AC voltage of the AC power source 200 and a waveform plot of the voltage at the first connection point P1. Specifically, the curve L51 represents the driving signal of the first switch transistor Q1. The curve L52 represents the voltage at the first connection point P1. The curve L53 represents the AC voltage from the AC power source 200, and the curve L54 represents the positive third voltage threshold and the negative third voltage threshold. In this embodiment, the AC power source is implemented as 220V utility power as an example.

In this embodiment, after the first switch transistor Q1 is turned on for the first time, when the absolute value of the AC voltage is not less than the third voltage threshold, that is, when the maximum positive value of the AC voltage is greater than the positive third voltage threshold or the minimum negative value of the AC voltage is less than the negative third voltage threshold, the first switch transistor Q1 is controlled to turn off, thereby achieving a limitation on the AC voltage input to the capacitor branch 30. Thereafter, when the absolute value of the AC voltage is less than the third voltage threshold, that is, when the maximum positive value of the AC voltage is less than the positive third voltage threshold or the minimum negative value of the AC voltage is greater than the negative third voltage threshold, the switch branch 20 is then controlled to be turned on again. As a result, the switch branch 20 is only turned on when the absolute value of the AC voltage is less than the third voltage threshold. Through such a control method, the voltage rating requirement of the electrical load 300 is reduced, leading to lower cost, higher efficiency, smaller size and higher power density.

It should be noted that the hardware structure of the power supply circuit 100 shown in FIG. 2 is only an example, The power supply circuit 100 may have more or fewer components than those shown in the figures. In addition, two or more components may be combined, or the power supply circuit 100 may have different component configurations.

Figure 6:
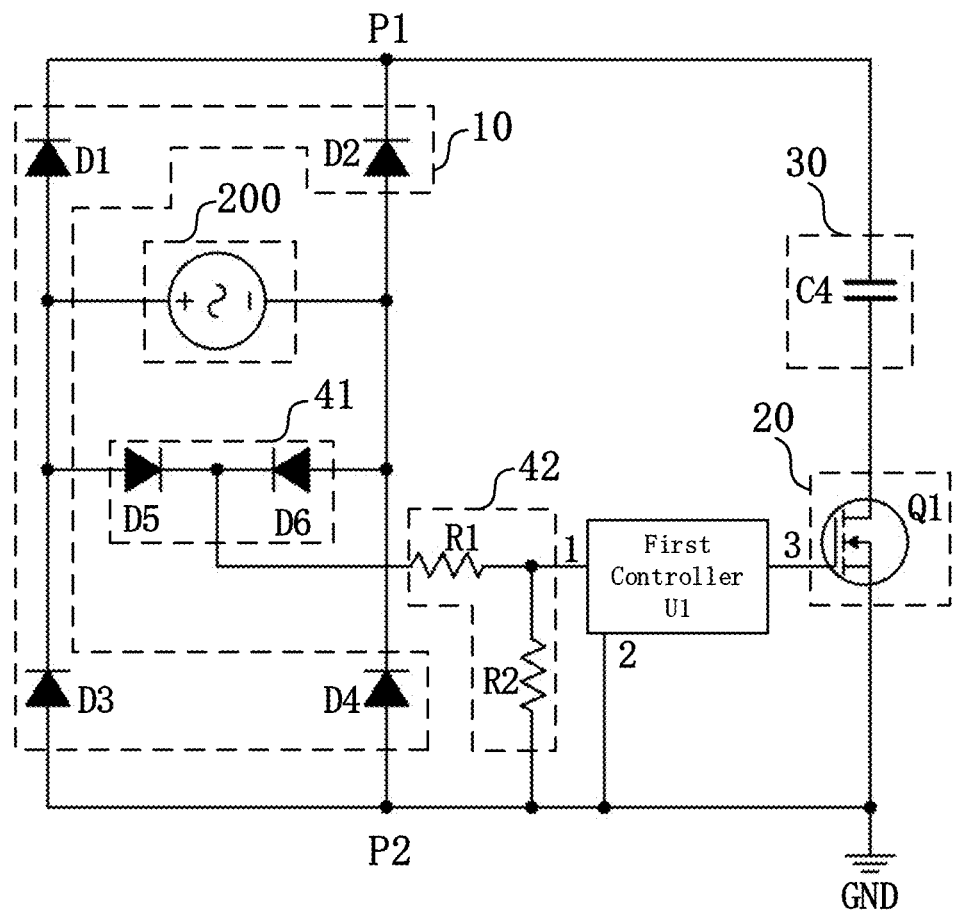
FIG. 6 is a schematic diagram of a power supply circuit provided by another embodiment of the present application.

The various components shown in the figure can be implemented in a combination of hardware, software, or a combination of hardware and software, including one or more signal processing and/or dedicated integrated circuits (e.g., ASIC). For example, in another embodiment, as shown in FIG. 6, when the first connection point P1 is connected to the capacitor branch 30, the second connection point P2 is connected to the switch branch 20. At this time, the difference from the circuit structure shown in FIG. 2 is that the second terminal of the switch branch 20 and the third terminal of the rectifier branch 10 are both grounded to GND. That is, the second connection point P2 is grounded to GND. The third terminal of the switch branch 20 is connected to the second terminal of the capacitor branch 30. Specifically, the first terminal of the fourth capacitor C4 is connected to the first connection point P1, and the second terminal of the fourth capacitor C4 is connected to the third terminal of the first switch transistor Q1. The second terminal of the first switch transistor Q1 is grounded.

It can be understood that in this embodiment, the control method for the first switch transistor Q1 described in FIG. 3-FIG. 5 can still be employed, incorporating the functions and advantages described in the previous embodiments. To avoid redundancy, the detailed explanation will not be repeated here, as it is within the range that those skilled in the art can easily understand.

Figure 7:
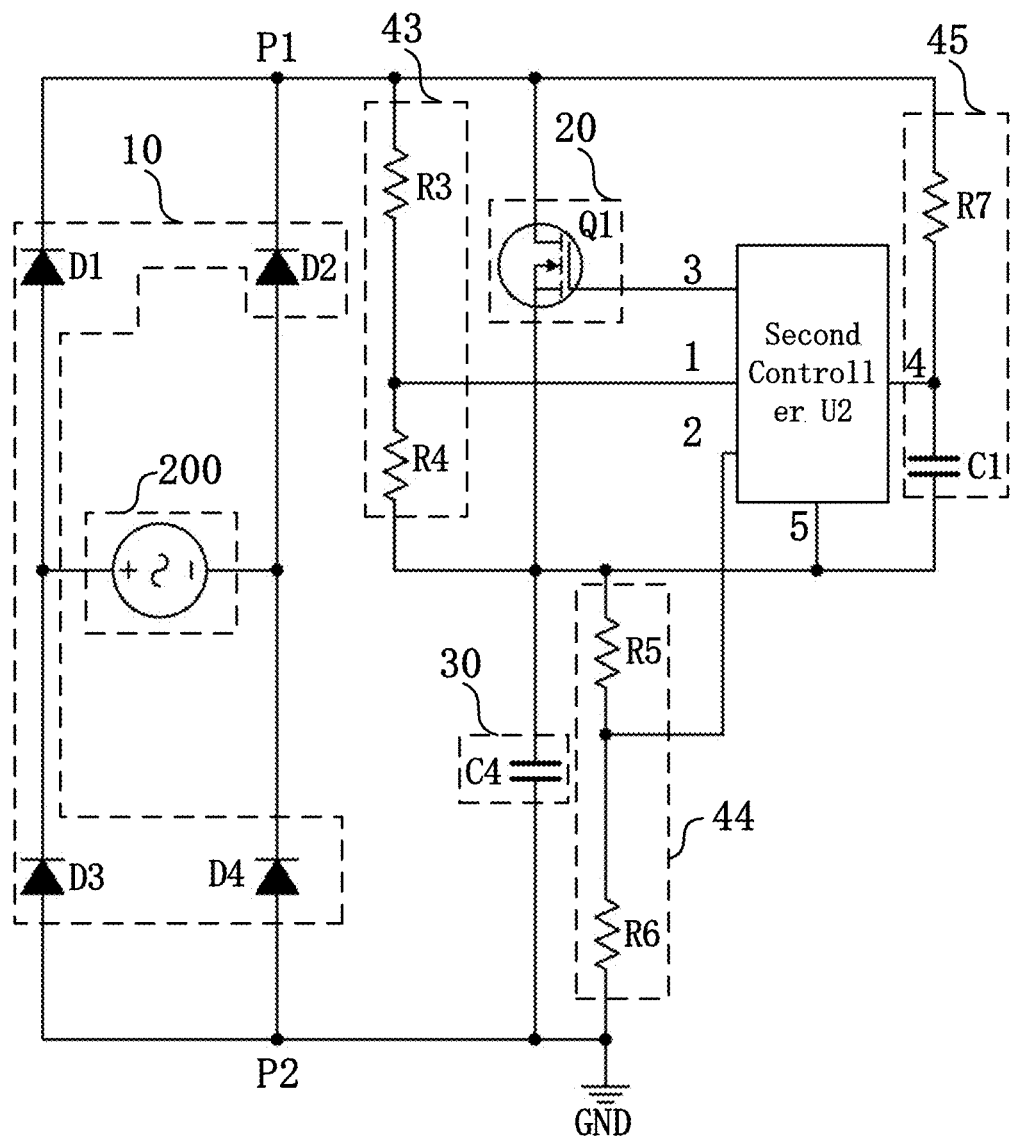
FIG. 7 is a schematic diagram of a power supply circuit provided by another embodiment of the present application.

For another example, in an embodiment, as shown in FIG. 7, the control branch 40 comprises a second voltage dividing branch 43, a third voltage dividing branch 44, a voltage conversion branch 45 and a second controller U2. The first terminal of the second voltage dividing branch 43 is connected to the fourth terminal of the rectifier branch 10, the third terminal of the switch branch 20 and the first terminal of the voltage conversion branch 45. The second terminal of the second voltage dividing branch 43 is connected to the first input terminal of the second controller U2 (i.e., the first pin of the second controller U2). The third terminal of the second voltage dividing branch 43 is connected to the second terminal of the switch branch 20, the first terminal of the capacitor branch 30, the first terminal of the third voltage dividing branch 44. The ground terminal of the second controller U2 (i.e., the fifth pin of the second controller U2) is connected to the second terminal of the voltage conversion branch 45. The third terminal of the voltage conversion branch 45 is connected to the power supply terminal of the second controller U2 (i.e., the fourth pin of the second controller U2). The second terminal of the third voltage dividing branch 44 is connected to the second input terminal of the second controller U2 (i.e., the second pin of the second controller U2). The first terminal of the switch branch 20 is connected to the first output terminal of the second controller U2 (i.e., the third pin of the second controller U2). The third terminals of the capacitor branch 30 and the third voltage dividing branch 44 are both grounded to GND.

Specifically, the second voltage dividing branch 43 is used to divide the first voltage and output the second detection voltage. The third voltage dividing branch 44 is used to divide the second voltage and output the third detection voltage. The second controller U2 is configured to output the first driving signal for the first time when the absolute value of the second detection voltage is less than a sixth voltage threshold, When the absolute value of the second voltage is less than the second voltage threshold, the absolute value of the second detection voltage is less than the sixth voltage threshold. The voltage conversion branch 45 is used to convert the voltage at the fourth terminal of the rectifier branch 10 to provide a power supply voltage for the second controller U2. The sixth voltage threshold may be set according to actual application conditions, and this embodiment of the present application does not impose specific limitations on its value.

In this embodiment, the second controller U2 obtains real-time measurements of the second detection voltage and the third detection voltage to determine the first voltage across the first switch transistor Q1 and the second voltage across the fourth capacitor C4.

Subsequently, when the electronic device powered by the power supply circuit 100 provided by this embodiment of the present application is turned on, if the second voltage is zero, the first voltage can be used to determine whether the AC power source 200 is in a position where it will not generate an inrush current. For example, the first voltage can be used to determine whether the AC voltage of the AC power source 200 is close to the zero-crossing point so as to ascertain if it is in a position where it will not generate an inrush current. If the second voltage is not zero, the first voltage is the difference between the absolute value of the AC voltage of the AC power source 200 and the second voltage. In this case, the first voltage can also be determined whether the AC power source 200 is in a position where it will not generate inrush current, for example, by checking if the first voltage is zero.

If it is determined that the AC power source 200 is in a position where it will not generate an inrush current, the first controller U1 can output a first driving signal to drive the first switch transistor Q1 to be in conduction state (turned on) for the first time, thereby reducing the risk of damaging electronic components due to inrush currents.

FIG. 7 illustrates an exemplary structure of the second voltage dividing branch 43 and the third voltage dividing branch 44, As shown in FIG. 7, the second voltage dividing branch 43 includes a third resistor R3 and a fourth resistor R4. The third voltage dividing branch 44 includes a fifth resistor R5 and a sixth resistor R6.

The first terminal of the third resistor R3 is connected to the third terminal of the switch branch 20. The second terminal of the third resistor R3 is connected to the first terminal of the fourth resistor R4 and the first input terminal of the second controller U2. The second terminal of the fourth resistor R4 is connected to the second terminal of the switch branch 20. The first terminal of the fifth resistor R5 is connected to the first terminal of the capacitor branch 30. The second terminal of the fifth resistor R5 is connected to the second input terminal of the second controller U2 and the first terminal of the sixth resistor R6. The second terminal of the sixth resistor R6 is grounded to GND.

FIG. 7 also shows an exemplary structure of the voltage conversion branch 45. As shown in FIG. 7, the voltage conversion branch 45 includes a seventh resistor R7 and a first capacitor C1. The first terminal of the seventh resistor R7 is connected to the third terminal of the switch branch 20. The second terminal of the seventh resistor R7 is connected to the first terminal of the first capacitor C1 and the power supply terminal of the second controller U2. The second terminal of the first capacitor C1 is connected to the second terminal of the switch branch 20.

Figure 8:
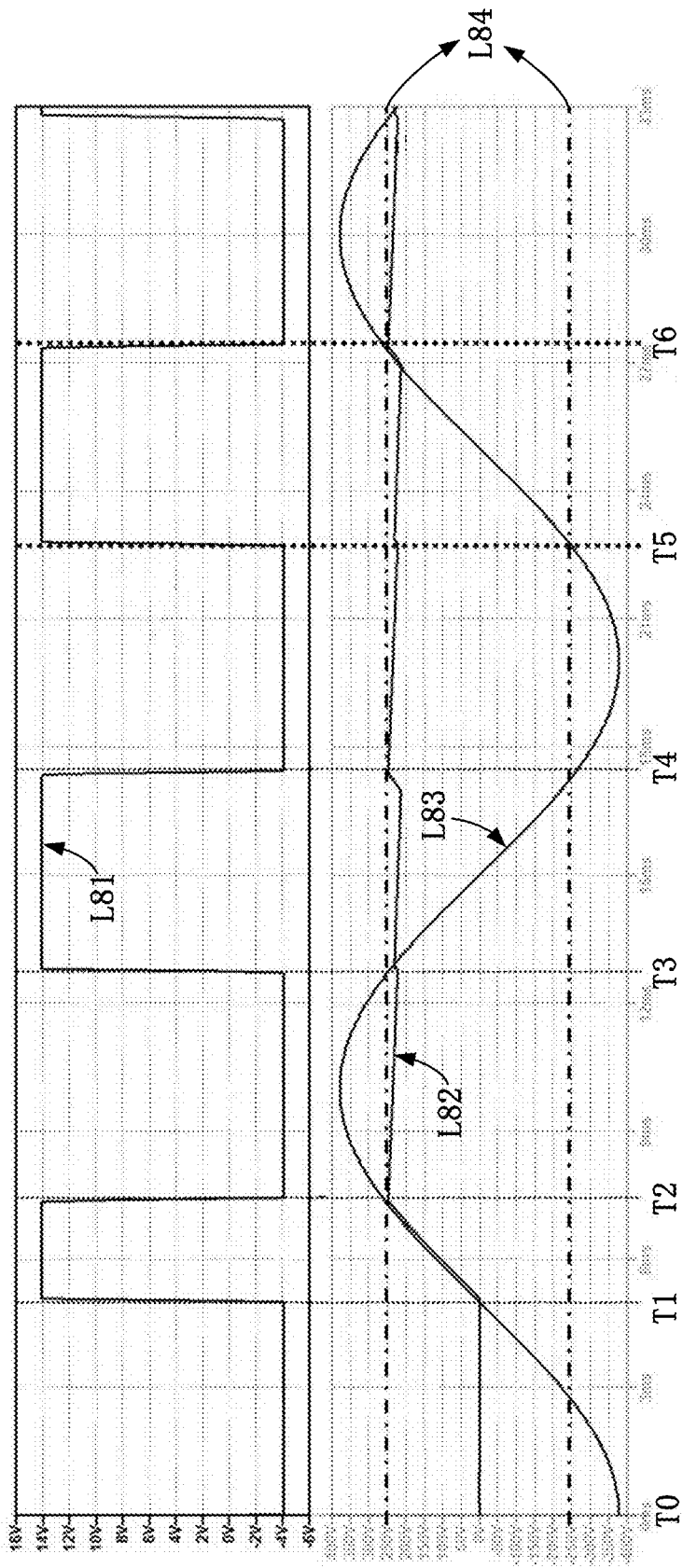
FIG. 8 is a waveform plot of each voltage in a power supply circuit provided by another embodiment of the present application.

Please refer to FIG. 7 and FIG. 8 together. FIG. 8 is a waveform plot of various voltages in the power supply circuit 100 according to an embodiment of the present application. The various voltages include the driving signal of the first switch transistor Q1, a fifth voltage threshold, the AC voltage of the AC power source 200 and the voltage waveform of the second voltage. The curve L81 is the driving signal of the first switch transistor Q1. The curve L82 is the second voltage. The curve L83 is the AC voltage of the AC power source 200. The curve L84 is the positive fifth voltage threshold and the negative fifth voltage threshold. In this embodiment, the AC power source is implemented as 220V utility power as an example.

As shown in FIG. 8, at the time of power on (i.e., at time T0), the phase of the AC voltage of the AC power source 200 is −90°, and the RMS value of the AC voltage at this time is at an extreme condition of −264 VAC (i.e., the maximum value of the RMS values of the AC voltage). At the same time, the voltage on the fourth capacitor C4 is zero.

At this time, the rectifier branch 10 rectifies the voltage from the AC power source 200, and the rectified voltage passes through the seventh resistor R7 and the first capacitor C1 to provide a power supply voltage for the second controller U2, enabling the second controller U2. And under this extreme condition, the second controller U2 controls the first switch transistor Q1 to remain off.

Until time T1, by setting the capacity of the fourth capacitor C4 to be much larger than the capacity of the first capacitor C1, the voltage on the fourth capacitor C4 can be kept close to zero. At this time, the second controller U2 determines that the second voltage is close to zero based on the second detection voltage, indicating that the AC voltage of the AC power source 200 is close to the zero-crossing point. The second controller U2 controls the first switch transistor Q1 to turn on. That is, the first switch transistor Q1 is turned on only when the absolute value of the AC voltage is close to zero. At this time, the current flowing through the rectifier branch 10 is also small, reducing the risk of damaging electronic components (the first rectifier diode D1).

As can be seen in this embodiment, by acquiring the second detection voltage, the first voltage across the first switch transistor Q1 is detected. Based on the detection result, the time point at which the first switch transistor Q1 is turned on (that is, the time point when the fourth capacitor C4 is connected) is delayed to the vicinity of the position where the first voltage is zero. Therefore, the maximum current flowing through the electronic components during power-on is a smaller current, which is beneficial for protecting the electronic components.

Furthermore, after the first conduction of switch branch 20, the power supply circuit 100 enters steady-state operation. At this time, it is also possible to control the conduction of the switch branch 20 by detecting the first voltage across two terminals of the switch branch 20 and/or detecting the second voltage across the capacitor branch 30, thereby achieving control of the voltage rating required for the electrical load 300.

For example, in one embodiment, the control branch 40 is further used to output a third driving signal when the second voltage across the capacitor branch 30 is not less than the fifth voltage threshold after the first conduction of switch branch 20. The switch branch 20 is also used to respond to the third driving signal and disconnect the connection between the rectifier branch and the capacitor branch. The fifth voltage threshold can be set according to the specific application, and this embodiment of the present application does not impose specific limitations on it.

In another embodiment, the control branch 40 is further used to output a first driving signal when the sum of the first voltage and the second voltage is not greater than the fifth voltage threshold after the first conduction and disconnection of the switch branch 20. This first driving signal is used to drive the conduction of the switch branch 20.

Specifically, the following will be explained in conjunction with FIG. 7 and FIG. 8.

After the first conduction of the first switch transistor Q1 and after time T1, the voltage on the fourth capacitor C4 can increase with the increase of the input AC voltage, completing the charging of the fourth capacitor C4. At this time, the second voltage is the absolute value of the AC voltage of the AC power supply 200.

After the power-on process is completed, between time T1 and T2, the second controller U2 determines that the second voltage remains less than the positive fifth voltage threshold based on the third detection voltage. In other words, it determines that the AC voltage of the AC power source 200 remains less than the positive fifth voltage threshold. Therefore, the second controller U2 controls the first switch transistor Q1 to remain in the conductive state.

Until time T2, the second controller U2 determines that the second voltage reaches the positive fifth voltage threshold based on the third detection voltage. At this time, the second controller U2 outputs a third driving signal fed into the first switch transistor Q1. The third drive signal is used to control the first switch transistor Q1 to be turned off, thereby disconnecting the connection between the rectifier branch 10 and the fourth capacitor C4. The second voltage on the fourth capacitor C4 is used to power the electrical load 300.

After the first conduction and disconnection of the first switch transistor Q1, that is, between time T2 and T3, the second controller U2 determines that the sum of the first voltage and the second voltage remains greater than the positive fifth voltage threshold based on the second detection voltage and the third detection voltage. In other words, it determines that the AC voltage of the AC power source 200 remains greater than the positive fifth voltage threshold. Therefore, the second controller U2 controls the first switch transistor Q1 to remain disconnected.

Until time T3, the second controller U2 determines that the AC voltage of the AC power source 200 has decreased to the positive fifth voltage threshold based on the second detection voltage and the third detection voltage, Consequently, the second controller U2 outputs the first driving signal again to drive the first switch transistor Q1 to be turned on. Then, between time T3 and time T4, the second controller U2 determines that the second voltage remains less than the fifth voltage threshold based on the third detection voltage, thus confirming that the AC voltage of the AC power source 200 stays below the positive fifth voltage threshold and greater than the negative fifth voltage threshold. That is, the absolute value of the AC voltage is less than the fifth voltage threshold. It can be seen that while meeting the voltage requirements of the electrical load 300, the second voltage can be limited to be less than the fifth voltage threshold. Therefore, by setting the fifth voltage threshold, it is possible to reduce the voltage rating requirements of the electrical load 300, thereby lowering the cost of components and mitigating the risk of damaging electronic components due to excessive input voltages.

Until time T4, the second controller U2 determines that the second voltage is greater than the fifth voltage threshold based on the third detection voltage. That is, the AC voltage of the AC power source 200 is less than the negative fifth voltage threshold. The second controller U2 outputs the third driving signal again to drive the first switch transistor Q1 to be turned off. Between time T4 and T5, the second controller U2 determines that the sum of the first voltage and the second voltage remains greater than the positive fifth voltage threshold based on the second detection voltage and the third detection voltage. That is, it confirms that the AC voltage of the AC power source 200 remains less than the negative fifth voltage threshold. Therefore, the second controller U2 controls the first switch transistor Q1 to remain turned off.

Until time T5, the second controller U2 determines that the AC voltage of the AC power source 200 has increased to the negative fifth voltage threshold based on the second detection voltage and the third detection voltage. The second controller U2 outputs the first driving signal again to drive the first switch transistor Q1 to be turned on. Then, between time T5 and time T6, the second controller U2 determines that the second voltage remains less than the fifth voltage threshold based on the third detection voltage, thus confirming that the AC voltage of the AC power source 200 remains less than the positive fifth voltage threshold and greater than the negative fifth voltage threshold. It can be seen that, at this time, the second voltage can be limited to be less than the fifth voltage threshold while meeting the voltage requirement of the electrical load 300. Therefore, by setting the fifth voltage threshold, it is possible to reduce the voltage rating requirements of the electrical load 300, thereby lowering the cost of components in the electrical load 300 and mitigating the risk of damaging electronic components due to excessive input voltages.

Until time T6, the second controller U2 determines that the second voltage is greater than the fifth voltage threshold based on the third detection voltage. That is, the AC voltage of the AC power source 200 is greater than the positive fifth voltage threshold. The second controller U2 outputs the third driving signal again to drive the first switch transistor Q1 to be turned off.

Furthermore, due to the periodicity of the AC power supply 200, the AC voltage of the AC power source 200 at time T6 is the same as the AC voltage of the AC power source 200 at time T2. Therefore, the aforementioned process can be repeated in a cyclic manner to control the turn-on and turn-off of the first switch transistor Q1, thereby maintaining the limitation on the second voltage across the fourth capacitor C4. This effectively reduces the voltage rating requirements of the electrical load 300 and mitigates the risk of damage to the electrical load 300 from excessive input voltage.

Figure 9:
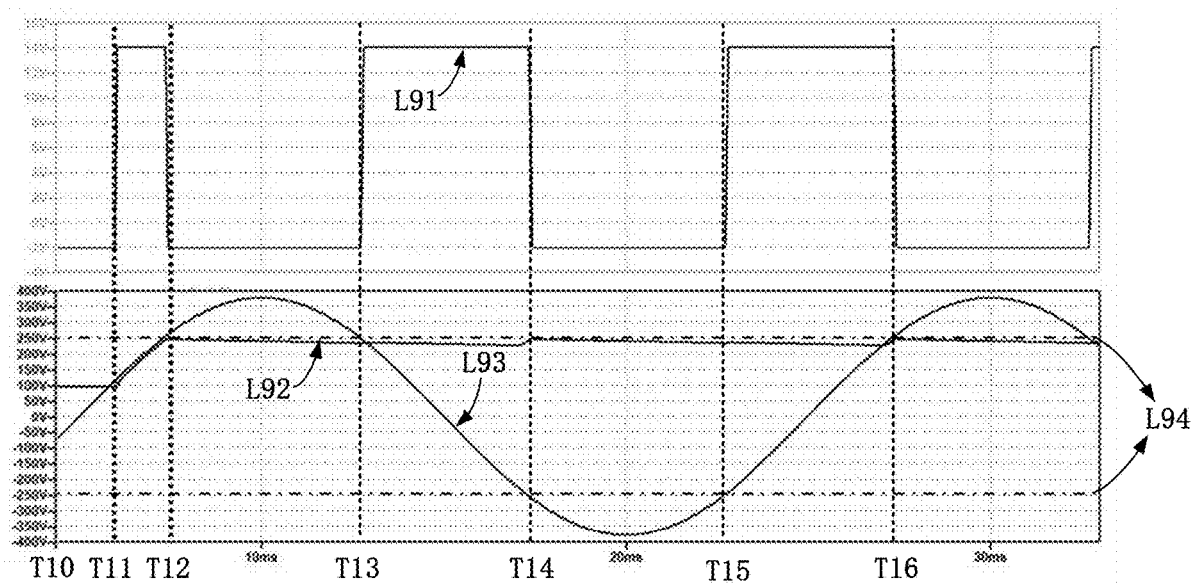
FIG. 9 is a waveform plot of each voltage in a power supply circuit provided by another embodiment of the present application.

It should be noted that, in another embodiment, if the voltage on the fourth capacitor C4 is not zero when the electronic device is powered on, the various voltages in the power supply circuit 100 can be as shown in FIG. 9. The specific implementation process is similar to that of the embodiment shown in FIG. 8, which will not be repeated here. The main difference between the embodiment shown in FIG. 9 and the embodiment shown in FIG. 8 lies in whether the voltage on the capacitor branch is zero before the first conduction of the switch branch 20. In the embodiment shown in FIG. 9, due to some reasons (such as, the just-disconnected rectifier branch immediately reconnecting with the AC power supply causing the charge on the capacitor branch to not dissipate completely), a certain voltage (e.g., 100V) is still maintained on the capacitor branch 30 at time T1. At this time, the second controller U2 still determines whether the second voltage is close to zero (i.e., whether the absolute value of the detected AC voltage from AC power source 200 is close to the voltage on the capacitor branch) based on the second detection voltage to determine the conduction time point of the switch branch 20. Although the waveform of the input AC voltage, as shown in L93, crosses zero shortly after time T0, the second voltage at this time is the voltage on the capacitor branch 30, which is not zero, and the second controller U2 keeps the first switch transistor Q1 remaining turned off. It is not turned on until time T11, when the second voltage approaches zero that. At this point, the second controller U2 controls the first switch transistor Q1 to turned on. That is, the first switch transistor Q1 is turned on only when the absolute value of the AC voltage is equal to the voltage on the capacitor branch 30. At this time, the current flowing through the rectifier branch 10 is also small, reducing the risk of damaging the electronic components (rectifier diode D1).

It can be seen that in this example, by obtaining the second detection voltage to detect the first voltage across the first switch transistor Q1, and based on the detection result, the time point of turning on the first switch transistor Q1 is (that is, the time point of connecting the fourth capacitor C4) is delayed to the vicinity of the first voltage being zero. This ensures that the maximum current flowing through the electronic components during startup is a smaller current, which helps to protect the electronic components.

Figure 10:
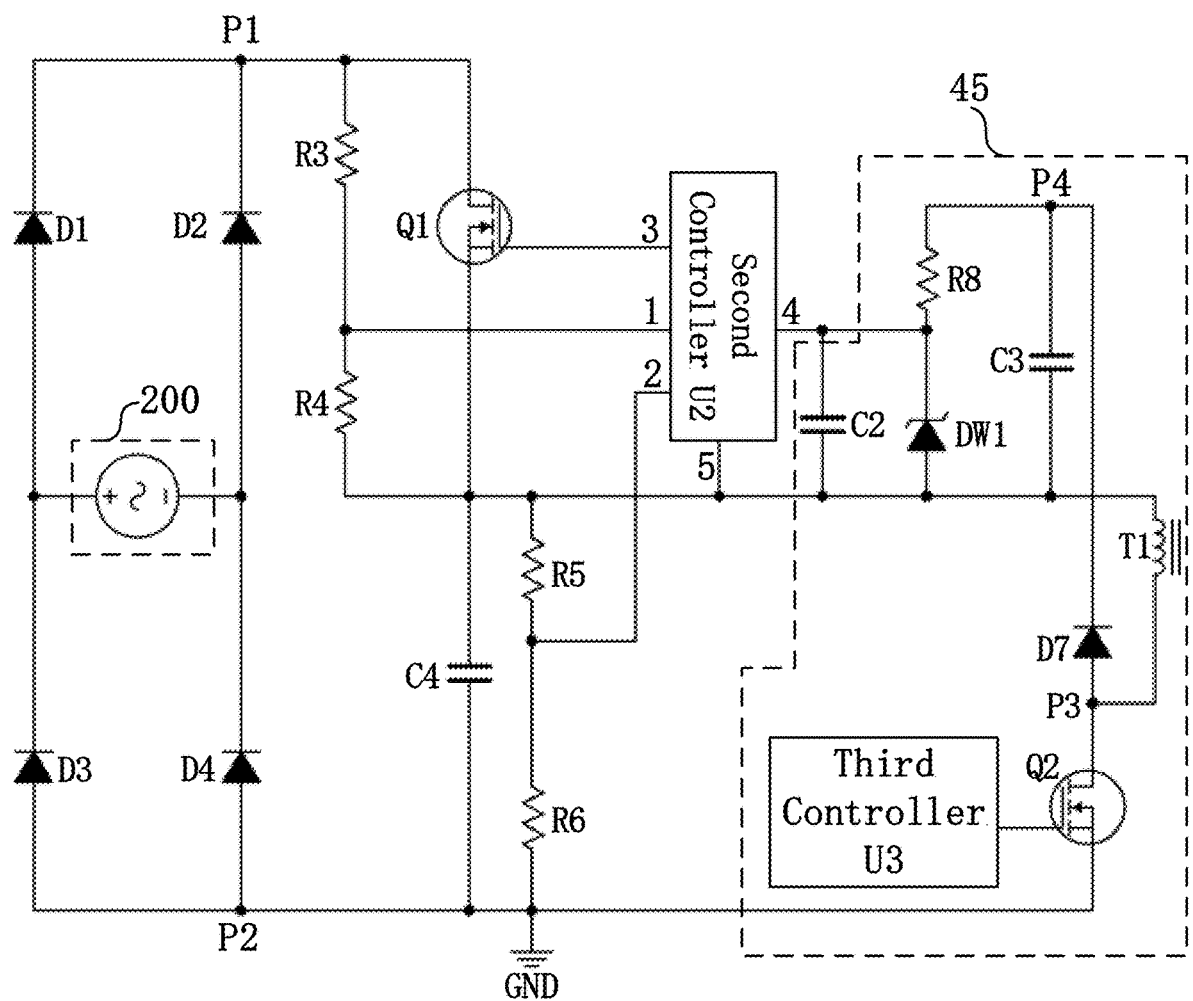
FIG. 10 is a schematic of a power supply circuit provided by another embodiment of the application.

In one embodiment, as shown in FIG. 10, the voltage conversion branch 45 includes a second capacitor C2, a third capacitor C3, an eighth resistor R8, a first Zener diode DW1, a seventh diode D7, a transformer T1, a second switch transistor Q2 and a third controller U3. The first terminal of the second capacitor C2 is connected to the cathode of the first Zener diode DW1, the first terminal of the eighth resistor R8 and the power supply terminal of the second controller U2. The second terminal of the second capacitor C2 is connected to the second terminal of the third capacitor C3, the anode of the first Zener diode DW1, and the first terminal of the transformer T1. The ground terminal of the second controller U2 is connected to the second terminal of the switch branch 20. The first terminal of the third capacitor C2 is connected to the cathode of the seventh diode D7 and the second terminal of the eighth resistor R8. The anode of the seventh diode D7 is connected to the second terminal of the transformer T1 and the third terminal of the second switch Q2. The second terminal of the second switch Q2 is grounded to GND, and the first terminal of the second switch Q2 is connected to the first output terminal of the third controller U3.

In this embodiment, the third capacitor C3, the eighth resistor R8 and the seventh diode D7 form an RCD (resistor, capacitor, diode) passive clamping unit. The RCD passive clamping unit can suppress the voltage spike at the third connection point P3 while achieving a lossless power supply for the second controller U2. The third connection point P3 is the connection point between the anode of the seventh diode D7 and the third terminal of the second switch transistor Q2.

In the circuit structure shown in FIG. 7, the power supply of the second controller U2 needs to be realized through the seventh resistor R7, resulting in additional losses. By using the voltage conversion branch 45 shown in FIG. 10, the lossless power supply for the first controller U1 can be achieved. The principle of realizing the lossless power supply of the first controller U1 by the voltage conversion branch 45 will be described below.

Figure 11:
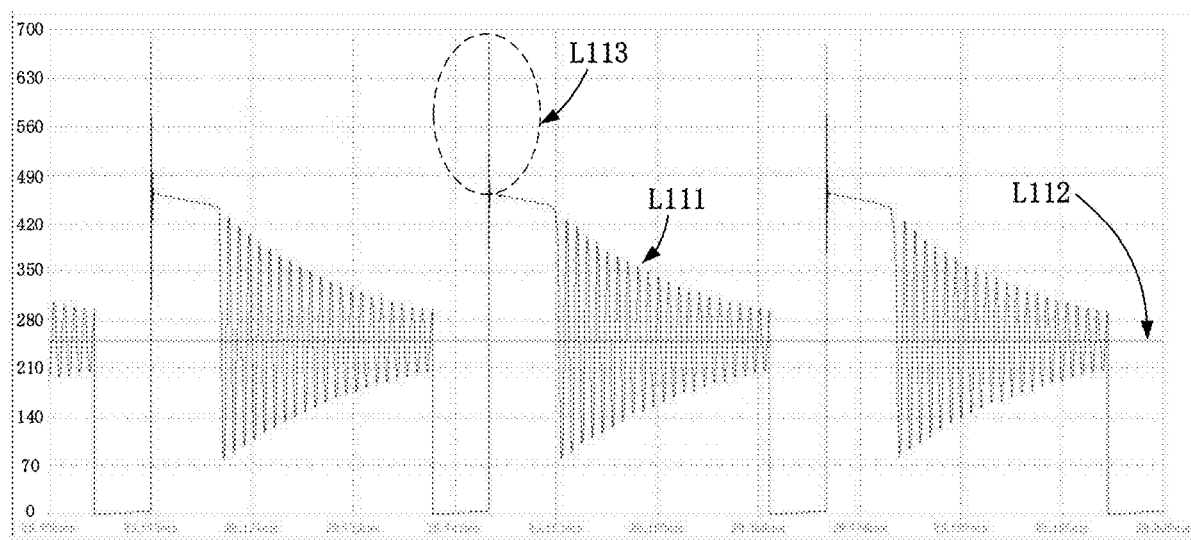
FIG. 11 provides waveform plot of each voltage of the voltage conversion branch in the circuit structure described in FIG. 10 when the passive clamping unit is not included.

Please refer to FIG. 10 and FIG. 11 together. FIG. 11 shows waveform plots of the second voltage across the fourth capacitor C4 and the voltage at the third connection point P3 in the voltage conversion branch 45 of the circuit structure shown in FIG. 10, without including the RCD passive clamping unit formed by the third capacitor C3, the eighth resistor R8 and the seventh diode D7. The curve L111 represents the voltage at the third connection point P3. The curve L112 represents the second voltage across the fourth capacitor C4. The curve L113 indicates the voltage spike caused by leakage inductance at the third connection point P3.

As shown in FIG. 11, the second voltage across the fourth capacitor C4 is maintained at 250V. Under ideal conditions, the highest voltage at the third connection point P3 is around 450V. However, in reality, the transformer T1 has leakage inductance, and when the second switch transistor Q2 is turned off, the energy stored in the leakage inductance cannot be discharged through the second switch transistor Q2. As a result, the leakage inductance pushes up the voltage at the third connection point P3. In other words, due to the presence of leakage inductance in the circuit, the voltage at the third connection point P3 is superimposed with a voltage greater than 200V when the second switch transistor Q2 is turned off, causing the maximum voltage at the third connection point P3 to exceed 650V. This voltage may cause damage to electronic components in the power supply circuit 100.

Figure 12:
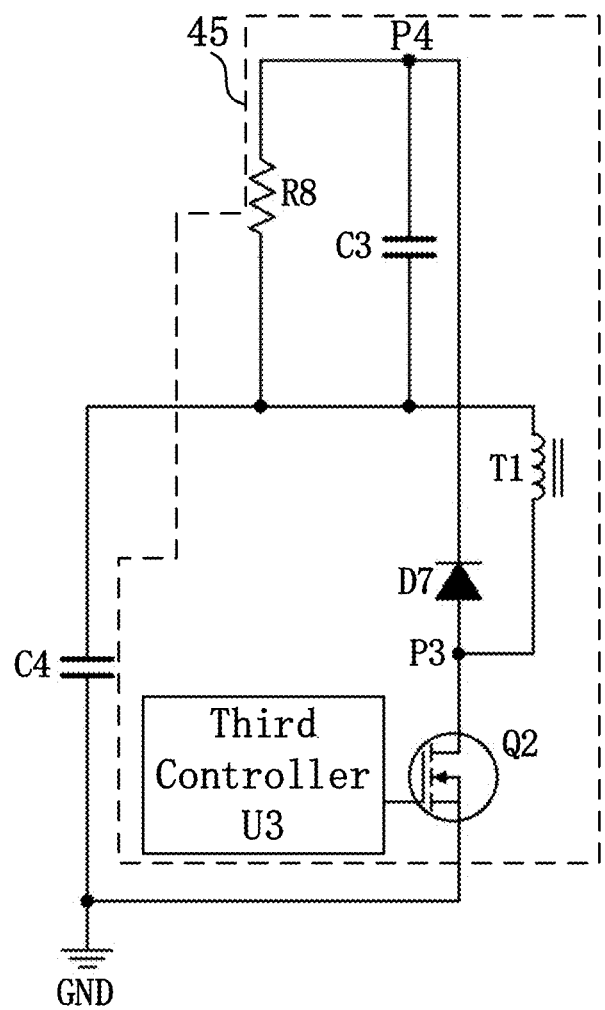
FIG. 12 is a schematic diagram of a circuit structure of a voltage conversion branch provided by an embodiment of the present application.
Figure 13:
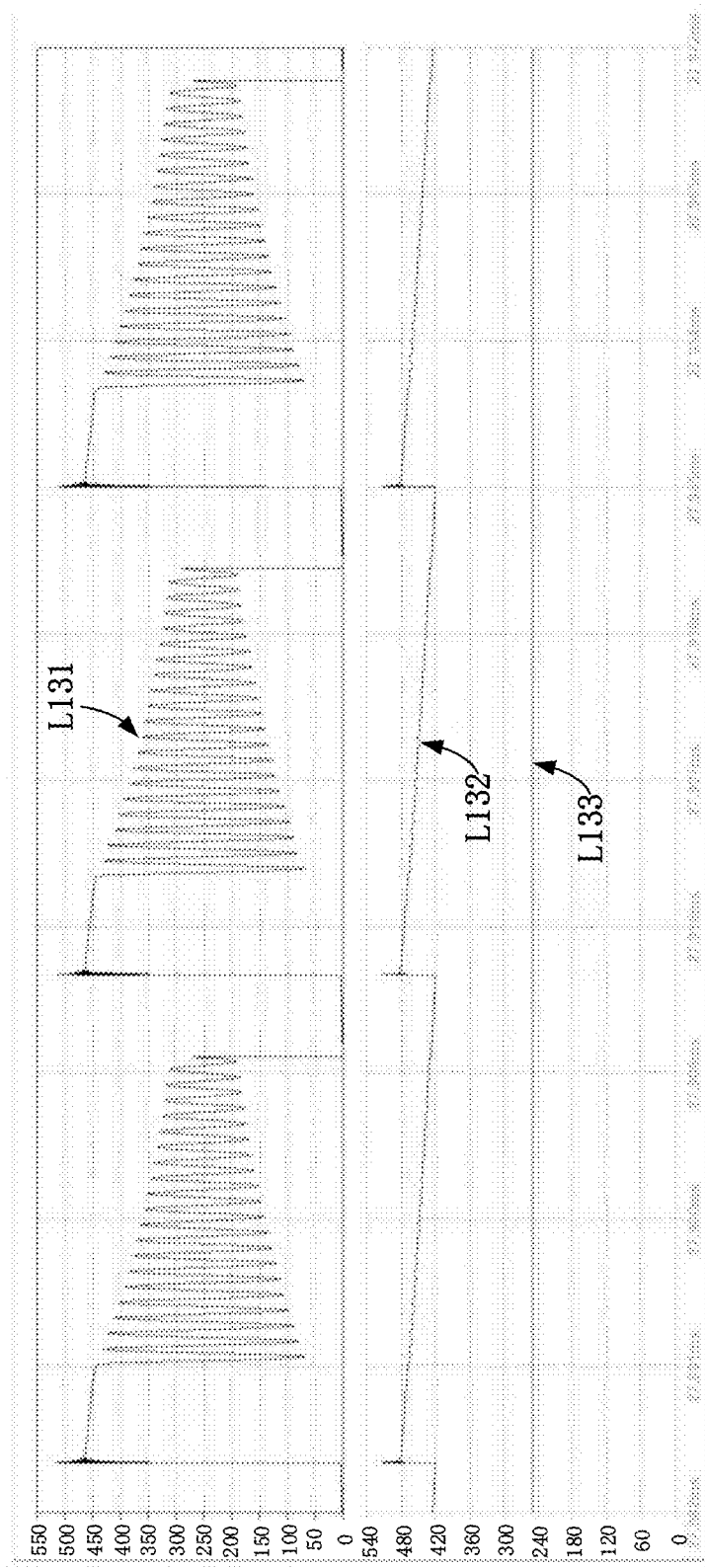
FIG. 13 is a waveform plot of each voltage in the circuit structure shown in FIG. 10 provided by an embodiment of the application.

Please refer to FIG. 12 and FIG. 13 together. FIG. 12 depicts the equivalent circuit of the voltage conversion branch 45 in the circuit structure shown in FIG. 10. This circuit includes only the passive clamping unit comprising the third capacitor C3, the eighth resistor R8 and the seventh diode D7. The second voltage across the fourth capacitor C4 and the voltage at the third connection point P3 are shown in FIG. 13. In FIG. 13, the curve L131 represents the voltage at the third connection point P3. The curve L133 represents the second voltage across the fourth capacitor C4, and the curve L134 indicates the voltage spike caused by leakage inductance at the third connection point P3.

As shown in FIG. 13, by adding the RCD passive clamping unit, when the second switch transistor Q2 is turned off, the seventh diode D7 in the RCD passive clamping unit provides a discharge path for the energy stored in the leakage inductance of the transformer T1. Specifically, the energy stored in the leakage inductance of the transformer charges the third capacitor C3 through seventh diode D7. Subsequently, the energy accumulated on the third capacitor C3 is dissipated through the eighth resistor R8, thereby reducing the voltage spike caused by the leakage inductance at the third connection point P3. The RCD passive clamping unit can clamp the voltage spike at the third connection point P3 to a level below 100V, reducing the risk of damaging electronic components.

As shown in FIG. 13, the curve L132 represents the voltage at the fourth connection point P4. The curve L133 represents the second voltage across the fourth capacitor C4. The voltage across the third capacitor C3 is the difference between the voltage at the fourth connection point P4 and the voltage at the third connection point P3, and this difference is greater than 150V, which is discharged by the eighth resistor R8 in one switching cycle and cannot be recovered. However, when the reference point of the second controller U2 is taken from the high-voltage terminal of the fourth capacitor C4, specifically, the first terminal of the fourth capacitor C4, and when the second controller U2 is used to control and drive the switch transistor Q1, which is also placed at the high-voltage terminal of the fourth capacitor C4, a first Zener diode DW1 can be added to the RCD passive clamping unit. Subsequently, a portion of the energy stored in the third capacitor C3 can be recovered to supply power to the second controller U2. Specifically, the third capacitor C3 supplies power to the second controller U2 by dividing the voltage with the eighth resistor R8. This approach allows for the full utilization of energy stored in the leakage inductance of the transformer T1, while also reducing the voltage spike at the third connection point P3. Moreover, it enables a lossless power supply provided for the second controller U2, thereby significantly improving efficiency of the power supply circuit 100.

Figure 14:
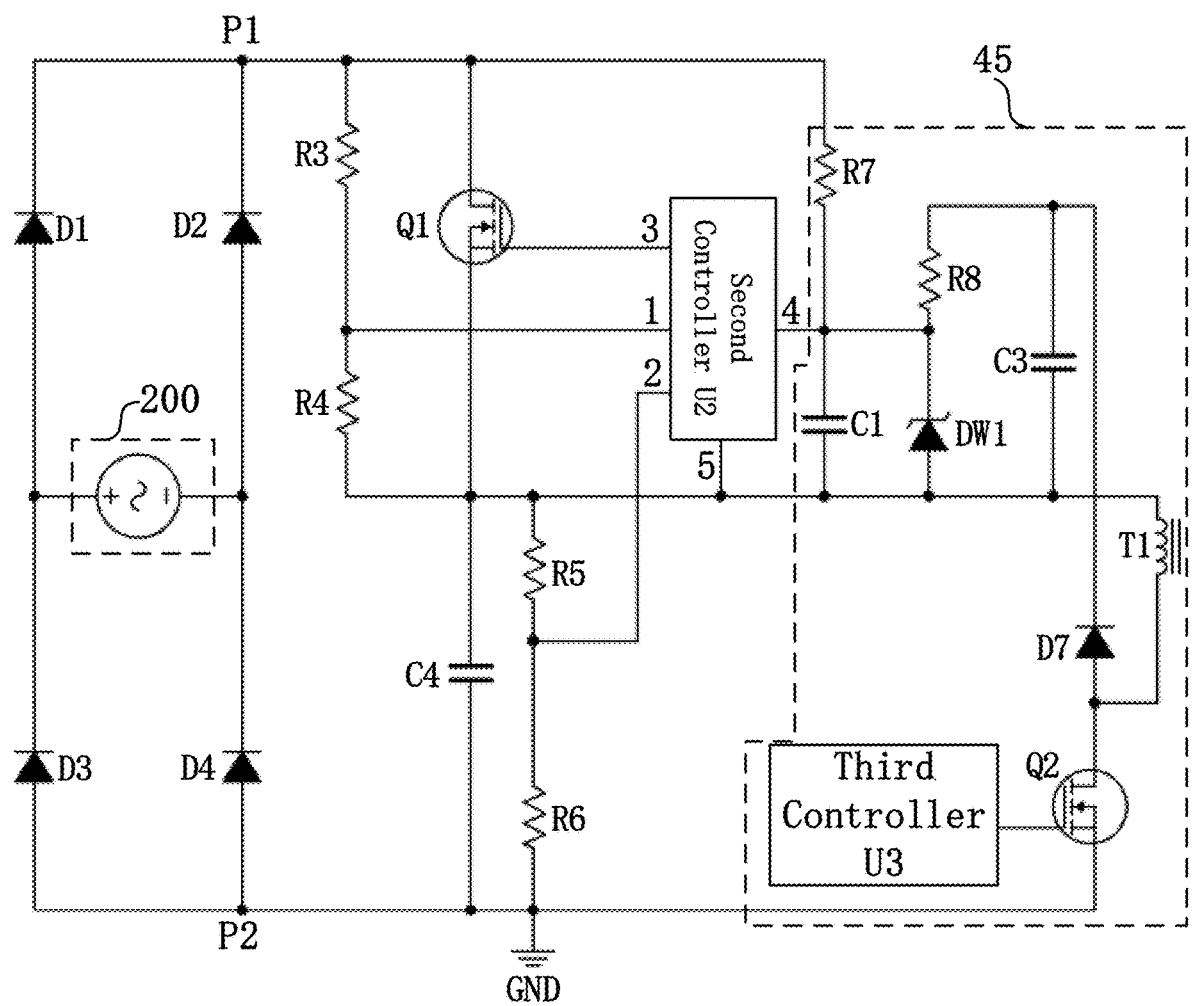
FIG. 14 is a schematic diagram of a power supply circuit provided by another embodiment of the application.

It can be understood that the voltage conversion branch 45 in the circuit structure shown in FIG. 7 can also be expanded using similar approach to that shown in FIG. 9. For example, as shown in FIG. 14, the voltage conversion branch 45 in the circuit structure shown in FIG. 7 can include the third capacitor C3, the eighth resistor R8, the first Zener diode DW1, the seventh diode D7, the transformer T1, the second switch transistor Q2 and a third controller U3. The specific connections and implementation process are similar to those shown in FIG. 9 with the addition of the seventh resistor R7.

The introduction of the seventh resistor R7 allows the voltage conversion branch 45 in the circuit structure shown in FIG. 14 to temporarily obtain initial power for the second controller U2 through the seventh resistor R7 during startup and recover part of the leakage inductance energy through the RCD passive clamping unit and the first Zener diode DW1 is configured to supply power to the second controller U2 when the circuit is running in a steady state. It is within the understanding of those skilled in the art, further details are not repeated here.

Figure 15:
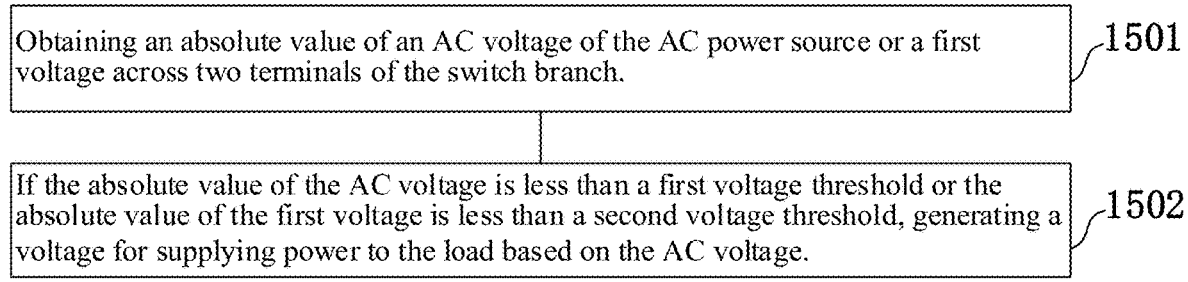
FIG. 15 is a flowchart of a power supply method provided by an embodiment of the present application.

Please refer to FIG. 15, which is a flowchart illustrating the power supply method provided by an embodiment of the present application. The power supply method is applied to a power supply circuit. The power supply circuit includes a rectifier branch, a switch branch and a capacitor branch. The rectifier branch is connected to an AC power source. The switch branch is connected between the rectifier branch and the capacitor branch. The capacitor branch is connected to an electrical load. The structure of the power supply circuit can be referred to specific descriptions provided above with respect to FIG. 1, FIG. 2, FIG. 6, FIG. 7, and FIG. 14, and will not be repeated here. The power supply method includes the following steps:

Step 1501: obtain the absolute value of the AC voltage of the AC power source, or the first voltage across the switch branch.

Step 1502: if the absolute value of the AC voltage is less than a first voltage threshold, or the absolute value of the first voltage is less than a second voltage threshold, generate a voltage to supply power to the electrical load.

In practical applications, when the power supply circuit is used in an electronic device, the power supply circuit starts operating when the electronic device is powered on. In some embodiments, the AC voltage of the AC power source is obtained, and the moment when there is no inrush current when supplying power to the electrical load is determined based on the AC voltage. Specifically, when the absolute value of the AC voltage of the AC power source is less than the first voltage threshold, it can be determined that the AC voltage of the AC power source allows the capacitor branch to be charged without generating an inrush current that damages the electronic components in the electronic device. In this case, the voltage for supplying power to the electrical load is generated based on the AC voltage, thereby reducing the risk of damaging the electronic components.

In other embodiments, the moment when there is no inrush current in the electronic components of the electronic device during the period of supplying power to the electrical load is determined by obtaining the first voltage between terminals of the switch. Specifically, when the electronic device is powered on, that is, when the power supply circuit 100 is started, if the voltage on the capacitor branch is zero, the voltage across two terminals of the switch branch is the AC voltage of the AC power supply. If the voltage on the capacitor branch is not zero, the voltage across the switch branch is the difference between the absolute value of the AC voltage of the AC power source and the voltage across the capacitor branch. Then, when the absolute value of the first voltage is less than the second voltage threshold, it can be determined that the AC voltage of the AC power source allows the capacitor branch to be charged without generating current that damages the electronic components in the electronic device. In this case, the voltage for supplying power to the electrical load is generated based on the AC voltage to reduce the risk of damage to the electronic components.

Figure 16:
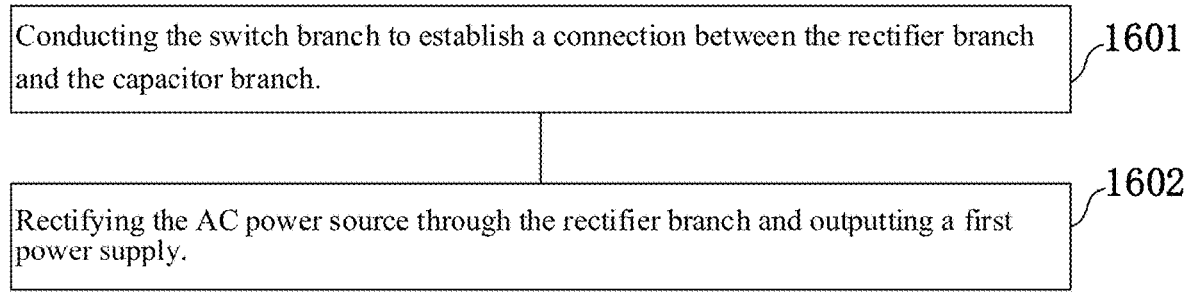
FIG. 16 is a flowchart of an implementation of step 1502 shown in FIG. 15 provided by an embodiment of the present application.

In one embodiment, as shown in FIG. 16, the process for generating a voltage for supplying power to an electrical load based on the AC voltage in step 1502 includes the following steps:

Step 1601: control the conduction of the switch branch to establish the connection between the rectifier branch and the capacitor branch.

Step 1602: rectify the AC voltage using the rectifier branch and output a first power supply.

In one embodiment, as shown in FIG. 17, in step 1502, if the absolute value of the AC voltage is less than the first voltage threshold, after the process of generating the voltage for supplying power to the electrical load based on the AC voltage, the power supply method further includes the following steps:

Step 1701: if the absolute value of the AC voltage is not less than a third voltage threshold, control the switch branch to disconnect.

Step 1702: after the switch branch is disconnected, if the absolute value of the AC voltage is less than the third voltage threshold, control the switch branch to conduct.

Figure 18:
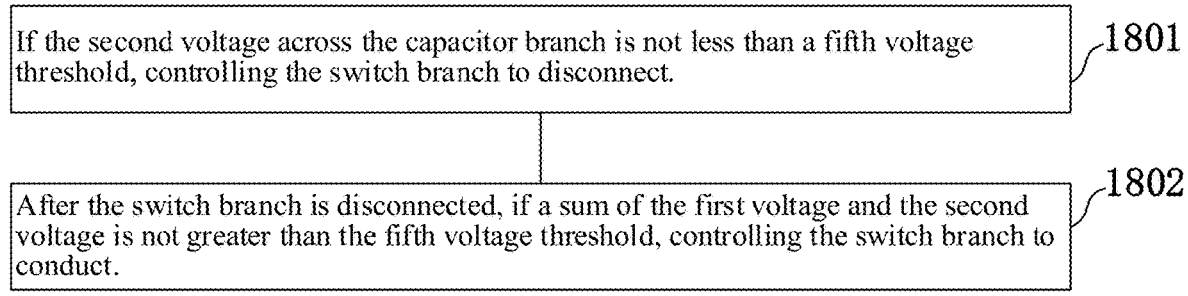
FIG. 18 is a flowchart of another implementation provided by an embodiment of the present application after step 1502 shown in FIG. 15 is performed.

In yet another embodiment, as shown in FIG. 18, in step 1502, if the absolute value of the first voltage is less than the second voltage threshold, after the process of generating the voltage for supplying power to the electrical load based on the AC voltage, the power supply method further includes the following steps:

Step 1801: if the second voltage across the capacitor branch is not less than the fifth voltage threshold, control the switch branch to disconnect.

Step 1802: after the switch branch is disconnected, if the sum of the first voltage and the second voltage is not greater than a fifth voltage threshold, control the switch branch to conduct.

It should be understood that, for the specific control of the power supply circuit and the beneficial effects achieved in the method embodiments, reference may be made to the corresponding descriptions in the above-mentioned embodiments of the power supply circuit, which are not repeated here for brevity.

An embodiment of the present application provides a controller 1900 for a power supply circuit. The controller 1900 for a power supply circuit may be implemented as a Microcontroller Unit (MCU) or a Digital Signal Processing (Digital Signal Processing, DSP) controller or the like.

Figure 19:
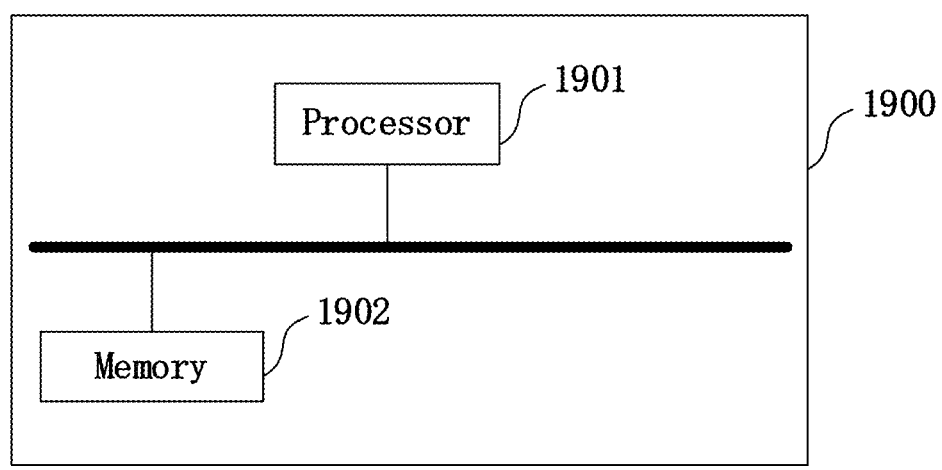
FIG. 19 is a schematic diagram of a controller for a power supply circuit provided by an embodiment of the present application.

As shown in FIG. 19, the controller 1900 of the power supply circuit includes at least one processor 1901 and a memory 1902. The memory 1902 can be built in the controller 1900 of the power supply circuit, or can be externally placed outside the controller 1900 of the power supply circuit, The memory 1902 may also be a remotely set memory, and the controller 1900 of the power supply circuit is connected to the memory 1902 through a network.

The memory 1902, as a non-volatile computer-readable storage medium, can be used to store non-volatile software programs, non-volatile computer-executable programs and modules. The memory 1902 may include a stored program area and a stored data area. The stored program area may store an operating system and an application program required by at least one function. The storage data area can store data or the like created according to the use of the terminal. In addition, the memory 1902 may include high-speed random-access memory, and may also include non-volatile memory such as at least one magnetic disk storage device, a flash memory device, or other non-volatile solid state storage devices. In some embodiments, the memory 1902 may optionally include memories located remotely from the processor 1901, and these remote memories may be connected to the terminal via a network. Examples of such networks include, but are not limited to, the Internet, an intranet, a local area network, a mobile communication network, and combinations thereof.

The processor 1901 executes various functions of the terminal and processes data by running or executing software programs and/or modules stored in the memory 1902, and calling data stored in the memory 1902. Thereby, the terminal is monitored as a whole. For example, the power supply method described in any embodiment of the present application is implemented.

The number of processors 1901 may be one or more, and one processor 1901 is taken as an example in FIG. 19. The processor 1901 and the memory 1902 may be connected by a bus or other means. The processor 1901 may include a central processing unit (CPU), a digital signal processor (DSP), an application specific integrated circuit (ASIC), a controller, a field programmable gate array (FPGA) device, and the like. The processor 1901 may also be implemented as a combination of computing devices, e.g., a combination of a DSP and a microprocessor, multiple microprocessors, one or more microprocessors combined with a DSP core, or any other such configuration.

The embodiments of the present application also provide electronic device, including the power supply circuit in any of the embodiments of the present application.

Embodiments of the present application further provide a non-volatile computer-readable storage medium, where the computer-readable storage medium stores computer-executable instructions, and the computer-executable instructions are executed by one or more processors, for example, executing the method steps of FIGS. 15, 16, 17 and 18 are described above.

Embodiments of the present application also provide a computer program product, including a computer program stored on a non-volatile computer-readable storage medium, where the computer program includes program instructions, and when the program instructions are executed by a computer. The computer executes the power supply method in any of the above method embodiments, for example, executes the method steps of FIG. 15, FIG. 16, FIG. 17 and FIG. 18 described above.

Finally, it should be noted that the above embodiments are only used to illustrate the technical solutions of the present application, but not to limit them; Under the idea of the present application, the technical features in the above embodiments or different embodiments can also be combined, the steps can be implemented in any order, and there are many other changes in different aspects of the present application as described above, for the sake of brevity, they are not provided in the details; Although the present application has been described in detail with reference to the foregoing embodiments, those of ordinary skill in the art should understand that: it is still possible to modify the technical solutions described in the foregoing embodiments, or perform equivalent replacements to some of the technical features; However, these modifications or substitutions do not make the essence of the corresponding technical solutions deviate from the scope of the technical solutions of the embodiments of the present application Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power supply circuit comprising:
a rectifier branch, a switch branch, a capacitor branch, and a control branch, wherein:
the rectifier branch is connected to an AC power source and is configured to rectify the AC power source to output a first power supply;
the control branch is connected to the AC power source and is configured to output a first driving signal for a first time when an absolute value of the AC voltage of the AC power source is less than a first voltage threshold;
the switch branch is connected to the control branch and is connected between the rectifier branch and the capacitor branch, and the switch branch is configured to conduct in response to the first driving signal to establish a connection between the rectifier branch and the capacitor branch, and wherein the switch branch conducts for the first time when the control branch first outputs the first driving signal; and
the capacitor branch is connected to a load and is configured to be charged by the first power supply when the capacitor branch is connected to the rectifier branch to output a voltage for supplying power to the load, wherein the control branch is further configured to output a second driving signal when the absolute value of the AC voltage is not less than a third voltage threshold after the switch branch has conducted for the first time, and in response to the second driving signal, the switch branch is configured to disconnect the connection between the rectifier branch and the capacitor branch, and wherein the control branch is further configured to output the first driving signal when the absolute value of the AC voltage is less than the third voltage threshold after the switch branch has conducted for the first time and has been disconnected.

2. The power supply circuit according to claim 1, wherein the rectifier branch comprises a first diode, a second diode, a third diode, and a fourth diode, and wherein:
an anode of the first diode is connected to a cathode of the third diode and a first terminal of the AC power source;
an anode of the second diode is connected to a cathode of the fourth diode and a second terminal of the AC power source;
a cathode of the first diode and a cathode of the second diode are connected to a first connection point;
an anode of the third diode and an anode of the fourth diode are connected to a second connection point;
the second connection point is connected to the capacitor branch when the first connection point is connected to the switch branch; and the second connection point is connected to the switch branch when the first connection point is connected to the capacitor branch.

3. The power supply circuit according to claim 1, wherein the control branch comprises a sampling branch, a first voltage dividing branch, and a first controller, and wherein:
a first terminal of the sampling branch is connected to a first terminal of the AC power source and a first terminal of the rectifier branch;
a second terminal of the sampling branch is connected to a second terminal of the AC power source and a second terminal of the rectifier branch;
a third terminal of the sampling branch is connected to a first terminal of the first voltage dividing branch;
a second terminal of the first voltage dividing branch is connected to a first input terminal of the first controller;
a third terminal of the first voltage dividing branch is connected to a third terminal of the rectifier branch and a ground terminal of the first controller;
a fourth terminal of the rectifier branch is connected to a first terminal of the capacitor branch;
a first output terminal of the first controller is connected to a first terminal of the switch branch;
a second terminal of the switch branch is connected to the third terminal of the rectifier branch;
a third terminal of the switch branch and a second terminal of the capacitor branch are both grounded, or, the second terminal of the switch branch is connected to the third terminal of the rectifier branch, and the third terminal of the switch branch is connected to the second terminal of the capacitor branch;
the sampling branch is configured to sample the AC power source and output a second power supply;
the first voltage dividing branch is configured to divide a voltage of the second power supply to output a first detection voltage; and
the first controller is configured to output the first driving signal for a first time when the first detection voltage is less than a fourth voltage threshold, wherein the first detection voltage is less than the fourth voltage threshold when the absolute value of the AC voltage is less than the first voltage threshold.

4. The power supply circuit according to claim 3, wherein the sampling branch comprises a fifth diode and a sixth diode, and wherein:
an anode of the fifth diode is connected to the first terminal of the AC power source;
a cathode of the fifth diode is connected to a cathode of the sixth diode and the first terminal of the first voltage dividing branch; and
the cathode of the sixth diode is connected to the second terminal of the AC power source.

5. The power supply circuit according to claim 3, wherein the first voltage dividing branch comprises a first resistor and a second resistor, and wherein:
a first terminal of the first resistor is connected to the third terminal of the sampling branch;
a second terminal of the first resistor is connected to the first input terminal of the first controller and a first terminal of the second resistor; and
a second terminal of the second resistor is connected to the third terminal of the rectifier branch.

6. The power supply circuit according to claim 1, wherein the switch branch comprises a first switch transistor, and wherein:
a first terminal of the first switch transistor is a first terminal of the switch branch;

a second terminal of the first switch transistor is a second terminal of the switch branch; and a third terminal of the first switch transistor is a third terminal of the switch branch.

7. The power supply circuit according to claim 1, wherein the capacitor branch comprises a fourth capacitor, and wherein:
  a first terminal of the fourth capacitor is a first terminal of the capacitor branch; and
  a second terminal of the fourth capacitor is a second terminal of the capacitor branch.

8. A power supply method applied to a power supply circuit including a rectifier branch, a switch branch, and a capacitor branch, wherein the rectifier branch is connected to an AC power source, the switch branch is connected between the rectifier branch and the capacitor branch, and the capacitor branch is connected to a load, the method comprising:
  obtaining an absolute value of a first voltage across two terminals of the switch branch; and
  if the absolute value of the first voltage is less than a second voltage threshold, generating a voltage for supplying power to the load based on the AC voltage.

9. The power supply method according to claim 8, wherein generating the voltage for supplying power to the load based on the AC voltage comprises:
  conducting the switch branch to establish a connection between the rectifier branch and the capacitor branch; and
  rectifying the AC power source through the rectifier branch and outputting a first power supply, and wherein the first power supply is used to charge the capacitor branch to generate a voltage for supplying power to the load.

10. The power supply method according to claim 9, wherein after a step of when the absolute value of the first voltage is less than the second voltage threshold, generating the voltage for supplying power to the load based on the AC voltage, further comprising the steps of:
  if a second voltage across the capacitor branch is not less than a fifth voltage threshold, controlling the switch branch to disconnect; and
  after the switch branch is disconnected, if a sum of the first voltage and the second voltage is not greater than the fifth voltage threshold, controlling the switch branch to conduct.

11. A power supply circuit comprising:
  a rectifier branch, a switch branch, a capacitor branch, and a control branch, wherein:
    the rectifier branch is connected to an AC power source and is configured to rectify the AC power source to output a first power supply;
    the control branch is connected to the AC power source and is configured to output a first driving signal for a first time when an absolute value of the AC voltage of the AC power source is less than a first voltage threshold, or to output the first driving signal for the first time when an absolute value of a first voltage across two terminals of the switch branch is less than a second voltage threshold;
    the switch branch is connected to the control branch and is connected between the rectifier branch and the capacitor branch, and the switch branch is configured to conduct in response to the first driving signal to establish a connection between the rectifier branch and the capacitor branch, and wherein the switch branch conducts for the first time when the control branch first outputs the first driving signal; and
    the capacitor branch is connected to a load and is configured to be charged by the first power supply when the capacitor branch is connected to the rectifier branch to output a voltage for supplying power to the load, wherein the control branch comprises a second voltage dividing branch, a third voltage dividing branch, a voltage conversion branch, and a second controller, and wherein:
      a first terminal of the second voltage dividing branch is connected to a fourth terminal of the rectifier branch, a third terminal of the switch branch and a first terminal of the voltage conversion branch;
      a second terminal of the second voltage dividing branch is connected to a first input terminal of the second controller;
      a third terminal of the second voltage dividing branch is connected to a second terminal of the switch branch, a first terminal of the capacitor branch, a first terminal of the third voltage dividing branch, a ground terminal of the second controller and a second terminal of the voltage conversion branch;
      a third terminal of the voltage conversion branch is connected to a power terminal of the second controller;
      a second terminal of the third voltage dividing branch is connected to a second input terminal of the second controller;
      a first terminal of the switch branch is connected to a first output terminal of the second controller;
      a second terminal of the capacitor branch and a third terminal of the third voltage dividing branch are both grounded;
      the second voltage dividing branch is configured to divide the first voltage and output a second detection voltage;
      the third voltage dividing branch is configured to divide the second voltage and output a third detection voltage;
      the second controller is configured to output the first driving signal for the first time when an absolute value of the second detection voltage is less than a sixth voltage threshold, and wherein the absolute value of the second detection voltage is less than the sixth voltage threshold when the absolute value of the second voltage is less than the second voltage threshold; and
      the voltage conversion branch is configured to convert a voltage at the fourth terminal of the rectifier branch to provide a power supply voltage for the second controller.

12. The power supply circuit according to claim 11, wherein the second voltage dividing branch comprises a third resistor and a fourth resistor, and the third voltage dividing branch comprises a fifth resistor and a sixth resistor, and wherein:
  a first terminal of the third resistor is connected to the third terminal of the switch branch;
  a second terminal of the third resistor is connected to a first terminal of the fourth resistor and the first input terminal of the second controller;
  a second terminal of the fourth resistor is connected to the second terminal of the switch branch;
  a first terminal of the fifth resistor is connected to the first terminal of the capacitor branch;

a second terminal of the fifth resistor is connected to the second input terminal of the second controller and a first terminal of the sixth resistor; and a second terminal of the sixth resistor is grounded.

13. The power supply circuit according to claim 11, wherein the voltage conversion branch comprises a seventh resistor and a first capacitor, and wherein:
a first terminal of the seventh resistor is connected to the third terminal of the switch branch;
a second terminal of the seventh resistor is connected to a first terminal of the first capacitor and the power terminal of the second controller; and
a second terminal of the first capacitor is connected to the second terminal of the switch branch.

14. The power supply circuit according to claim 11, wherein the voltage conversion branch comprises a second capacitor, a third capacitor, an eighth resistor, a first voltage regulator diode, a seventh diode, a transformer, a second switch transistor, and a third controller, and wherein:
a first terminal of the second capacitor is connected to a cathode of the first voltage regulator diode, a first terminal of the eighth resistor and the power terminal of the second controller;
a second terminal of the second capacitor is connected to a second terminal of the third capacitor, an anode of the first voltage regulator diode, a first terminal of the transformer, the ground terminal of the second controller and the second terminal of the switch branch;
a first terminal of the third capacitor is connected to a cathode of the seventh diode and a second terminal of the eighth resistor;
an anode of the seventh diode is connected to a second terminal of the transformer and a third terminal of the second switch transistor;
a second terminal of the second switch transistor is grounded;
a first terminal of the second switch transistor is connected to a first output terminal of the third controller.

15. A power supply circuit comprising:
a rectifier branch, a switch branch, a capacitor branch, and a control branch, wherein:
the rectifier branch is connected to an AC power source and is configured to rectify the AC power source to output a first power supply;
the control branch is connected to the AC power source and is configured to output the first driving signal for the first time when an absolute value of a first voltage across two terminals of the switch branch is less than a second voltage threshold;

the switch branch is connected to the control branch and is connected between the rectifier branch and the capacitor branch, and the switch branch is configured to conduct in response to the first driving signal to establish a connection between the rectifier branch and the capacitor branch, and wherein the switch branch conducts for the first time when the control branch first outputs the first driving signal; and
the capacitor branch is connected to a load and is configured to be charged by the first power supply when the capacitor branch is connected to the rectifier branch to output a voltage for supplying power to the load.

16. The power supply circuit according to claim 15, wherein:
the control branch is further configured to output a third driving signal when a second voltage across two terminals of the capacitor branch is not less than a fifth voltage threshold after the switch branch has conducted for the first time; and
in response to the third driving signal, the switch branch is further configured to disconnect the connection between the rectifier branch and the capacitor branch.

17. The power supply circuit according to claim 16, wherein:
the control branch is further configured to output the first driving signal when a sum of the first voltage and the second voltage is not greater than the fifth voltage threshold after the switch branch has conducted for the first time and has been disconnected.

18. The power supply circuit according to claim 15, wherein the switch branch comprises a first switch transistor, and wherein:
a first terminal of the first switch transistor is a first terminal of the switch branch;
a second terminal of the first switch transistor is a second terminal of the switch branch; and
a third terminal of the first switch transistor is a third terminal of the switch branch.

19. The power supply circuit according to claim 15, wherein the capacitor branch comprises a fourth capacitor, and wherein:
a first terminal of the fourth capacitor is a first terminal of the capacitor branch; and
a second terminal of the fourth capacitor is a second terminal of the capacitor branch.

* * * * *